United States Patent
Shimokawa et al.

(10) Patent No.: US 10,696,877 B2
(45) Date of Patent: Jun. 30, 2020

(54) CURABLE RESIN COMPOSITION, POLARIZING FILM AND METHOD FOR MANUFACTURE THEREOF, OPTICAL FILM, AND IMAGE DISPLAY DEVICE

(71) Applicant: NITTO DENKO CORPORATION, Ibaraki-shi, Osaka (JP)

(72) Inventors: Kayo Shimokawa, Ibaraki (JP); Ryoko Asai, Ibaraki (JP); Taiki Shimokuri, Ibaraki (JP); Yoshiaki Ito, Ibaraki (JP); Tatsuya Yamasaki, Ibaraki (JP)

(73) Assignee: NITTO DENKO CORPORATION, Ibaraki-Shi, Osaka (JP)

( * ) Notice: Subject to any disclaimer, the term of this patent is extended or adjusted under 35 U.S.C. 154(b) by 291 days.

(21) Appl. No.: 15/492,415

(22) Filed: Apr. 20, 2017

(65) Prior Publication Data

US 2017/0306197 A1     Oct. 26, 2017

(30) Foreign Application Priority Data

Apr. 22, 2016  (JP) ............... 2016-086189

(51) Int. Cl.
| | | |
|---|---|---|
| *C09J 135/02* | (2006.01) | |
| *C09J 7/30* | (2018.01) | |
| *C09J 4/00* | (2006.01) | |
| *G02B 1/14* | (2015.01) | |
| *B32B 7/12* | (2006.01) | |
| *B32B 27/30* | (2006.01) | |
| *B32B 37/14* | (2006.01) | |
| *C09J 5/06* | (2006.01) | |
| *B32B 37/12* | (2006.01) | |
| *G02B 5/30* | (2006.01) | |

(52) U.S. Cl.
CPC ............. *C09J 135/02* (2013.01); *B32B 7/12* (2013.01); *B32B 27/306* (2013.01); *B32B 37/14* (2013.01); *C09J 4/00* (2013.01); *C09J 5/06* (2013.01); *C09J 7/30* (2018.01); *G02B 1/14* (2015.01); *B32B 2037/1253* (2013.01); *B32B 2307/412* (2013.01); *B32B 2307/42* (2013.01); *B32B 2310/08* (2013.01); *B32B 2457/20* (2013.01); *C09J 2203/318* (2013.01); *C09J 2429/006* (2013.01); *C09J 2433/00* (2013.01); *G02B 5/3033* (2013.01)

(58) Field of Classification Search
CPC ..... C09J 135/02; C09J 4/00; C09J 5/06; C09J 7/30; C09J 2203/318; C09J 2429/006; B32B 7/12; B32B 27/306; B32B 2037/1253; B32B 2307/412; B32B 2307/42; B32B 2310/08; B32B 2457/20; G02B 1/14; G02B 5/3033
See application file for complete search history.

(56) References Cited

U.S. PATENT DOCUMENTS

| 2015/0049380 A1 | 2/2015 | Takeda et al. |
| 2015/0152299 A1 | 6/2015 | Saito et al. |

FOREIGN PATENT DOCUMENTS

| JP | H07-329252 A | 12/1995 |
| JP | 2001-296427 A | 10/2001 |
| JP | 2012-52000 A | 3/2012 |
| JP | 2013-228726 A | 11/2013 |
| JP | 2014-129505 A | 7/2014 |
| JP | 2015-108099 A | 6/2015 |
| JP | 2017-075986 A | 4/2017 |

OTHER PUBLICATIONS

Japanese Office Action dated Feb. 20, 2020 corresponding to Japanese Application No. 2016-086189, with English translation.

*Primary Examiner* — Edward J Cain

(74) *Attorney, Agent, or Firm* — Hauptman Ham, LLP

(57) ABSTRACT

A curable resin composition for forming an adhesive layer on at least one surface of a substrate (C), the curable resin composition comprising:
a compound (A) represented by formula (1):

[Formula 1]

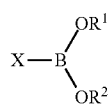

(1)

wherein X represents a functional group containing a reactive group, and $R^1$ and $R^2$ each independently represent a hydrogen atom or an optionally substituted, aliphatic hydrocarbon, aryl, or heterocyclic group; and
an adhesion aid compound (B),
the curable resin composition satisfying formula (X): $-10 \leq HSP(A) - HSP(B) \leq 10$ and formula (Y): $-10 \leq HSP(C) - HSP(B) \leq 10$, wherein HSP (A) is an HSP value of the compound (A), HSP (B) is an HSP value of the adhesion aid compound (B), and HSP (C) is an HSP value of the substrate (C).

13 Claims, No Drawings

CURABLE RESIN COMPOSITION, POLARIZING FILM AND METHOD FOR MANUFACTURE THEREOF, OPTICAL FILM, AND IMAGE DISPLAY DEVICE

CROSS REFERENCE TO RELATED APPLICATION

This application claims the priority of Japanese Patent Application No. 2016-086189, filed on Apr. 22, 2016 in the Japan Patent Office, the disclosure of which is incorporated herein by reference.

BACKGROUND OF THE INVENTION

Field of the Invention

The invention relates to a polarizing film including a polarizer and an adhesive layer formed on at least one surface of the polarizer by curing a curable resin composition. The polarizing film may be used alone or as a part of a laminated optical film to form an image display device such as a liquid crystal display (LCD), an organic electroluminescent (EL) display, a cathode ray tube (CRT), or a plasma display panel (PDP).

Description of the Related Art

The liquid crystal display market has experienced rapid growth in many applications such as clocks, cellular phones, personal digital assistants (PDAs), notebook PCs, PC monitors, DVD players, and TVs. Liquid crystal display devices use liquid crystal switching to visualize the polarization state, and on the basis of the display principle, they use polarizers. Particularly in TV applications, higher brightness, higher contrast, and wider viewing angle are required, and polarizing films are also required to have higher transmittance, higher degree of polarization, and higher color reproducibility.

For example, iodine polarizers composed of stretched polyvinyl alcohol (hereinafter, also simply referred to as "PVA") and iodine adsorbed thereto are most popular polarizers widely used because of their high transmittance and high degree of polarization. A polarizing film commonly used includes a polarizer and transparent protective films bonded to both sides of the polarizer with a solution of a polyvinyl alcohol-based material in water, what is called a water-based adhesive (Patent Document 1 listed below). Transparent protective films are made of a high water-vapor permeability material such as triacetyl cellulose. When the water-based adhesive is used (in what is called wet lamination), the lamination of the polarizer and the transparent protective films must be followed by a drying step.

On the other hand, active energy-ray curable adhesives are proposed as alternatives to the water-based adhesives. The process of producing polarizing films using active energy ray-curable adhesives requires no drying step and thus can improve the productivity of polarizing films. For example, the inventors have proposed a radically-polymerizable, active energy ray-curable, adhesive containing an N-substituted amide monomer as a curable component (Patent Document 2 listed below).

PRIOR ART DOCUMENTS

Patent Documents

Patent Document 1: JP-A-2001-296427
Patent Document 2: JP-A-2012-052000

SUMMARY OF THE INVENTION

Problems to be Solved by the Invention

The adhesive layer formed using the active energy ray-curable adhesive described in Patent Document 2 can sufficiently withstand a water resistance test in which, for example, the adhesive layer is immersed in warm water at 60° C. for 6 hours and then evaluated for the presence or absence of decoloration or peeling. Now, however, adhesives for polarizing films are being required to have further improved water resistance at such a level that they can withstand a severer water resistance test in which, for example, they are immersed in water (to saturation) and then subjected to the evaluation of whether or not they peel when scratched at edges with fingernail. In fact, therefore, adhesives for polarizing films, including the active energy ray-curable adhesive described in Patent Document 2 and those reported so far, are susceptible to further improvement in water resistance.

It is an object of the invention, which has been made in view of the above circumstances, to provide a curable resin composition capable of forming an adhesive layer that has good adhesion to substrates and is highly water-resistant even under harsh conditions such as dewing environments and immersion in water.

It is another object of the invention to provide a polarizing film that includes a polarizer, an adhesive layer formed by curing the curable resin composition, and a transparent protective film provided on at least one surface of the polarizer with the adhesive layer interposed therebetween, and thus has good adhesion between the polarizer and the transparent protective film and is superior in the water resistance of the adhesive layer. It is a further object of the invention to provide an optical film including the polarizing film and to provide an image display device having the polarizing film or the optical film.

Means for Solving the Problems

As a result of intensive studies to solve the problems, the inventors have accomplished the invention on the basis of the finding that the objects can be achieved by using a specific curable resin composition to form an adhesive layer on at least one surface of a substrate.

Specifically, the invention is directed to a curable resin composition for forming an adhesive layer on at least one surface of a substrate (C), the curable resin composition including:

a compound (A) represented by formula (1):

[Formula 1]

wherein X represents a functional group containing a reactive group, and $R^1$ and $R^2$ each independently represent a hydrogen atom or an optionally substituted, aliphatic hydrocarbon, aryl, or heterocyclic group; and an adhesion aid compound (B), the curable resin composition satisfying formula (X): $-10 \leq \text{HSP (A)} - \text{HSP (B)} \leq 10$ and formula (Y): $-10 \leq \text{HSP (C)} - \text{HSP (B)} \leq 10$, wherein HSP (A) is the HSP value of the compound (A), HSP (B) is the HSP value of the adhesion aid compound (B), and HSP (C) is the HSP value of the substrate (C).

In the curable resin composition, the adhesion aid compound (B) is preferably at least one compound selected from the group consisting of: a compound (B)-1 represented by formula (2):

[Formula 2]

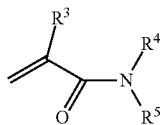
(2)

wherein $R^3$ is a hydrogen atom or a methyl group, $R^4$ and $R^5$ are each independently a hydrogen atom, an alkyl group, a hydroxyalkyl group, an alkoxyalkyl group, or a cyclic ether group, and $R^4$ and $R^5$ may form a heterocyclic ring; a compound (B)-2 represented by formula (3):

[Formula 3]

(3)

wherein $R^6$ is a hydrogen atom, an alkyl group, a hydroxyalkyl group, an alkoxyalkyl group, or a cyclic ether group, and may form a heterocyclic ring; a compound (B)-3 represented by formula (4):

[Formula 4]

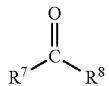
(4)

wherein $R^7$ and $R^8$ are each independently an amide group, an alkyl group, a hydroxyalkyl group, an alkoxyalkyl group, or a cyclic ether group, and may form a heterocyclic ring; and a compound (B)-4 represented by formula (5):

[Formula 5]

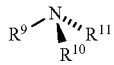
(5)

wherein $R^9$, $R^{10}$, and $R^{11}$ are each independently a hydrogen atom, a hydroxyl group, an alkyl group, a hydroxyalkyl group, an alkoxyalkyl group, or a cyclic ether group, and may form a heterocyclic ring.

In the curable resin composition, the compound represented by formula (1) is preferably a compound represented by formula (1'):

[Formula 6]

(1')

wherein Y is a phenylene group or an alkylene group, and X, $R^1$, and $R^2$ have the same meanings as defined above.

In the curable resin composition, the reactive group of the compound (A) is preferably at least one reactive group selected from the group consisting of a vinyl group, a (meth)acrylic group, a styryl group, a (meth)acrylamide group, a vinyl ether group, an epoxy group, an oxetane group, and a mercapto group.

The invention is also directed to a laminate including: a substrate (C); and an adhesive layer formed on at least one surface of the substrate (C) by curing the curable resin composition having any of the features set forth above.

The invention is also directed to a polarizing film including: a polyvinyl alcohol-based polarizer as a substrate (C); an adhesive layer formed by curing the curable resin composition having any of the features set forth above; and a transparent protective film provided on at least one surface of the polyvinyl alcohol-based polarizer with the adhesive layer interposed between the polarizer and the transparent protective film.

The invention is also directed to an optical film including a laminate including at least one piece of the polarizing film set forth above. The invention is further directed to an image display device including the polarizing film or optical film set forth above.

The invention is further directed to a method of manufacturing a laminate including a substrate (C) and an adhesive layer formed on at least one surface of the substrate (C) by curing a curable resin composition, the method including the steps of: coating at least one surface of the substrate (C) with the curable resin composition having any of the features set forth above; and curing the curable resin composition by applying an active energy ray to the curable resin composition from the substrate (C) surface side or the curable resin composition-coated surface side. The invention is also directed to a method of manufacturing a polarizing film including a polyvinyl alcohol-based polarizer as a substrate (C), an adhesive layer formed by curing a curable resin composition, and a transparent protective film provided on at least one surface of the polyvinyl alcohol-based polarizer with the adhesive layer interposed between the polarizer and the transparent protective film, the method including the steps of: coating the surface of at least one of the polarizer and the transparent protective film with the curable resin composition having any of the features set forth above; laminating the polarizer and the transparent protective film together; and bonding the polarizer and the transparent protective film together with the adhesive layer formed therebetween by curing the curable resin composition by application of an active energy ray to the curable resin composition from the polarizer surface side or the transparent protective film surface side.

Effect of the Invention

The curable resin composition according to the invention can be advantageously used to form an adhesive layer for a polarizing film. Such an adhesive layer has high water resistance even under harsh conditions such as dewing environments and immersion in water. Why the adhesive layer formed using the curable resin composition according to the invention has such advantageous effects will be described below with reference to a polarizing film as an example.

When exposed to a dewing environment, a polarizing film including a polyvinyl alcohol-based polarizer (hereinafter also simply referred to as a "polarizer") and an adhesive layer disposed thereon may undergo peeling off between the polarizer and the adhesive layer by the following mechanism. First, water diffuses into the adhesive layer and the polarizer and reaches the interface between the adhesive and the polarizer. In a conventional polarizing film, where hydrogen bonds and/or ionic bonds greatly contribute to the adhering strength between the adhesive layer and the polarizer, the water diffusing to the polarizer interface side causes dissociation of hydrogen bonds and ionic bonds at the interface and thus reduces the adhering strength between the adhesive layer and the polarizer. In a dewing environment, this can cause peeling off between the adhesive layer and the polarizer.

Against this, the curable resin composition according to the invention includes the compound (A) having a boric acid group and/or a borate ester group (the compound of formula (1)) and the adhesion aid compound (B) and satisfies formula (X): $-10 \leq HSP (A)-HSP (B) \leq 10$ and formula (Y): $-10 \leq HSP (C)-HSP (B) \leq 10$, wherein HSP (A) is the HSP value of the compound (A), HSP (B) is the HSP value of the adhesion aid compound (B), and HSP (C) is the HSP value of the substrate (C) such as a polarizer. When the composition satisfies formula (X), the compound (A) and the adhesion aid compound (B) have high affinity for each other, and in the presence of the adhesion aid compound (B), the compound (A) has improved dispersibility in the composition. As a result, the compound (A) can react with other curable components in the curable resin composition through the mediation of the reactive group of the compound (A), so that the boric acid group and/or the borate ester group will be introduced from the compound (A) into the polymer constituting the adhesive layer. In addition, when the composition satisfies formula (Y), the adhesion aid compound (B) and the polarizer have high affinity for each other, and the surface of the polarizer is plasticized and modified with the adhesion aid compound (B). The plasticized and modified surface of the polarizer has a large number of functional groups such as hydroxyl groups, and hydroxyl groups and other groups on the surface are strongly vertically oriented by the plasticization and modification of the polarizer surface. As a result, the hydroxyl groups and other groups of the polarizer can easily react with the boric acid group and/or the borate ester group introduced from the compound (A) into the polymer constituting the adhesive layer, so that a large number of covalent bonds will be formed for strong adhesion between the adhesive layer and the polarizer. Therefore, even when water exists at the interface between the polarizer and the adhesive layer, the polarizer and the adhesive layer can strongly interact with each other not only through hydrogen bonds and/or ionic bonds but also through the covalent bonds, which will dramatically improve the water-resistant adhesion between the polarizer and the adhesive layer.

DETAILED DESCRIPTION OF THE PREFERRED EMBODIMENTS

The curable resin composition according to the invention includes the compound (A) and the adhesion aid compound (B) and satisfies the following formulae (X) and (Y):

$$-10 \leq HSP(A)-HSP(B) \leq 10 \quad (X)$$

$$-10 \leq HSP(C)-HSP(B) \leq 10 \quad (Y),$$

wherein HSP (A) is the HSP value of the compound (A), HSP (B) is the HSP value of the adhesion aid compound (B), and HSP (C) is the HSP value of the substrate (C) on which the adhesive layer is to be formed.

Now, a method for calculating the HSP value (solubility parameter) will be described.

(Method for Calculating Solubility Parameter (HSP Value))

In the invention, the solubility parameters (HSP values) of the compound (A), the adhesion aid compound (B), and the substrate (C), such as a polarizer, are the values obtained by Hansen's calculation method (using HSPiP version 4.1.07 calculation software).

In other words, the solubility parameters (HSP values) are the Hansen solubility parameters, which are the values for use in predicting the solubility of the materials as presented by Chares M. Hansen in 1967.

The Hansen solubility parameter is composed of the following three parameters:

δD: energy caused by intermolecular dispersion force
δP: energy caused by intermolecular dipolar interaction
δH: energy caused by intermolecular hydrogen bonding.

These three parameters can be regarded as coordinates in a three-dimensional space.

The index used at this time is calculated by substituting the three Hansen's components into the following HSP calculation formula.

$$HSP=\sqrt{(\delta D^2+\delta P^2+\delta H^2)} \quad \text{[Mathematical formula 1]}$$

In the invention, the HSP value (HSP (A)) of the compound (A) and the HSP value (HSP (B)) of the adhesion aid compound (B) satisfy the formula (X): $-10 \leq HSP (A)-HSP (B) \leq 10$. According to this feature, the compound (A) and the adhesion aid compound (B) have high affinity for each other, and in the presence of the adhesion aid compound (B), the compound (A) has improved dispersibility in the composition. As a result, the compound (A) can react with other curable components in the curable resin composition through the mediation of the reactive group of the compound (A), so that the boric acid group and/or the borate ester group will be introduced from the compound (A) into the polymer constituting the adhesive layer. The adhesion between the adhesive layer and the substrate (C), such as a polarizer, increases as HSP (A) and HSP (B) become closer to each other. Therefore, the relation $-8 \leq HSP (A)-HSP (B) \leq 8$ is preferred, and the relation $-6 \leq HSP (A)-HSP (B) \leq 6$ is more preferred.

In the invention, the HSP value (HSP (C)) of the substrate, such as a polarizer, and the HSP value (HSP (B)) of the adhesion aid compound (B) also satisfy the formula (Y): $-10 \leq HSP (C)-HSP (B) \leq 10$. According to this feature, the adhesion aid compound (B) and the polarizer have high affinity for each other, and the surface of the polarizer is plasticized and modified with the adhesion aid compound (B). The plasticized and modified surface of the polarizer has a large number of functional groups such as hydroxyl groups, and hydroxyl groups and other groups on the surface are strongly vertically oriented by the plasticization and modification of the polarizer surface. As a result, the hydroxyl groups and other groups of the polarizer can easily react with the boric acid group and/or the borate ester group introduced from the compound (A) into the polymer constituting the adhesive layer, so that a large number of covalent bonds will be formed. The adhesion between the adhesive layer and the substrate (C), such as the polarizer, increases as HSP (C) and HSP (B) become closer to each other. Therefore, the relation −8≤HSP (C)−HSP (B)≤8 is preferred, and the relation −6≤HSP (C)−HSP (B)≤6 is more preferred.

<Compound (A)>

The compound (A) is represented by formula (1):

[Formula 7]

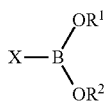
(1)

wherein X represents a functional group containing a reactive group, and $R^1$ and $R^2$ each independently represent a hydrogen atom or an optionally substituted, aliphatic hydrocarbon, aryl, or heterocyclic group. The aliphatic hydrocarbon group may be an optionally substituted linear or branched alkyl group of 1 to 20 carbon atoms, an optionally substituted cyclic alkyl group of 3 to 20 carbon atoms, or an alkenyl group of 2 to 20 carbon atoms. The aryl group may be, for example, an optionally substituted phenyl group of 6 to 20 carbon atoms or an optionally substituted naphthyl group of 10 to 20 carbon atoms. The heterocyclic group may be, for example, an optionally substituted five- or six-membered ring group containing at least one heteroatom. These groups may be linked together to form a ring. In formula (1), $R^1$ and $R^2$ are each preferably a hydrogen atom or a linear or branched alkyl group of 1 to 3 carbon atoms, most preferably a hydrogen atom.

In the compound (A), X is a functional group containing a reactive group. The functional group can react with other curable components in the curable resin composition. The reactive group in the group X may be, for example, a hydroxyl group, an amino group, an aldehyde group, a carboxyl group, a vinyl group, a (meth)acrylic group, a styryl group, a (meth)acrylamide group, a vinyl ether group, an epoxy group, or an oxetane group. When the curable resin composition used in the invention is active energy ray-curable, the reactive group in the group X is preferably at least one reactive group selected from the group consisting of a vinyl group, a (meth)acrylic group, a styryl group, a (meth)acrylamide group, a vinyl ether group, an epoxy group, an oxetane group, and a mercapto group. Particularly when the curable resin composition is radically polymerizable, the reactive group in the group X is preferably at least one reactive group selected from the group consisting of a (meth)acrylic group, a styryl group, and a (meth)acrylamide group. When having a (meth)acrylamide group, the compound (A) can be highly reactive and thus undergo high degree of copolymerization with the active energy ray-curable resin composition, which is more preferred. The (meth)acrylamide group is also preferred because it has high polarity and can produce good adhesion, which makes it possible to efficiently obtain the effects of the invention. When the curable resin composition used in the invention is cationically polymerizable, the reactive group in the group X preferably has at least one functional group selected from a hydroxyl group, an amino group, an aldehyde group, a carboxyl group, a vinyl ether group, an epoxy group, an oxetane group, and a mercapto group. In particular, the reactive group preferably has an epoxy group, so that the resulting adhesive layer can have high tackiness to the adherend, and the reactive group preferably has a vinyl ether group, so that the resulting curable resin composition can have good curing properties.

A preferred example of the compound (A) is a compound represented by formula (1'):

[Formula 8]

(1')

wherein Y is a phenylene group or an alkylene group, and X, $R^1$, and $R^2$ have the same meanings as defined above. More preferred examples of the compound (A) include compounds (1a), (1b), (1c), and (1d) shown below.

[Formula 9]

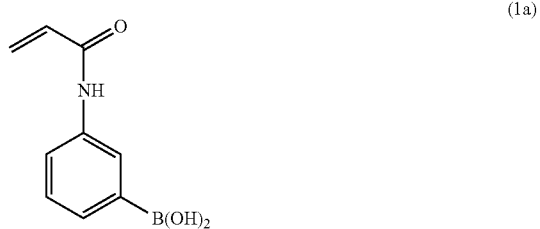
(1a)

(1b)

(1c)

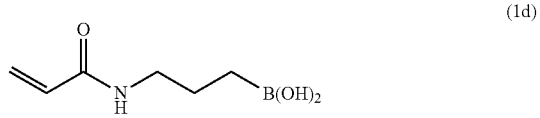
(1d)

In the invention, the compound (A) may have the reactive group directly bonded to the boron atom. As shown in the above examples, however, the compound (A) preferably has the reactive group and the boron atom bonded together with a phenylene or alkylene group between them. In other words, the compound (A) is preferably represented by formula (1'). If the compound (A) has the reactive group bonded to the boron atom with an oxygen atom between them, the adhesive layer obtained by curing the curable resin composition containing the compound (A) may tend to have degraded water-resistant adhesion. On the other hand, in a preferred mode, the compound (A) can improve the water-resistant adhesion when having the reactive group bonded to the boron atom with a phenylene or alkylene group between them, in other words, when having the reactive group together with a boron-carbon bond rather than a boron-oxygen bond. In the invention, the compound (A) also preferably has the reactive group and the boron atom bonded together with an optionally substituted organic group of 1 to 20 carbon atoms between them, which can also improve the water-resistant adhesion of the adhesive layer obtained after the curing. The optionally substituted organic group of 1 to 20 carbon atoms may be, for example, an optionally substituted linear or branched alkylene group of 1 to 20 carbon atoms, an optionally substituted cyclic alkylene group of 3 to 20 carbon atoms, an optionally substituted phenylene group of 6 to 20 carbon atoms, or an optionally substituted naphthylene group of 10 to 20 carbon atoms.

Besides the compounds listed above, examples of the compound (A) may also include an ester of boric acid and hydroxyethylacrylamide, an ester of boric acid and methylolacrylamide, an ester of boric acid and hydroxyethyl acrylate, an ester of boric acid and hydroxybutyl acrylate, and other esters of boric acid and (meth)acrylates.

The preferred range of the HSP value (HSP (A)) of the compound (A) is preferably close to the HSP value (HSP (C)) of the substrate (C), on which the adhesive layer is to be formed, and thus depends on the type of the substrate (C). For example, when a polyvinyl alcohol-based polarizer (HSP value: 36.0) is used as the substrate (C), the compound (A) preferably has an HSP value (HSP (A)) of 25 to 45, more preferably 28 to 40. When a non-alkali glass (HSP value: 28.4) is used as the substrate (C), the HSP (A) is preferably from 20 to 40, more preferably from 23 to 35.

The content of the compound (A) in the curable resin composition is preferably from 0.1 to 10% by weight, more preferably from 0.2 to 8% by weight, even more preferably from 0.5 to 5% by weight, in order to improve the adhesion and the water-resistant adhesion between the adhesive layer and a polarizer, specifically, in order to improve the adhesion and the water-resistant adhesion between a polarizer and a transparent protective film bonded together with the adhesive layer interposed therebetween.

<Adhesion Aid Compound (B)>

The adhesion aid compound (B) used in the invention has an HSP value (HSP (B)) satisfying formulae (X): $-10 \leq HSP(A) - HSP(B) \leq 10$ and formula (Y): $-10 \leq HSP(C) - HSP(B) \leq 10$ in relation to the HSP value (HSP (A)) of the compound (A) and the HSP value (HSP (C)) of the substrate (C).

The preferred range of the HSP value (HSP (B)) of the adhesion aid compound (B) is preferably close to the HSP value (HSP (C)) of the substrate (C), on which the adhesive layer is to be formed, and thus depends on the type of the substrate (C). For example, when a polyvinyl alcohol-based polarizer (HSP value: 36.0) is used as the substrate (C), the adhesion aid compound (B) preferably has an HSP value (HSP (B)) of 25 to 45, more preferably 28 to 40. When a non-alkali glass (HSP value: 28.4) is used as the substrate (C), the HSP (B) is preferably from 20 to 40, more preferably from 23 to 35.

The adhesion aid compound (B) is preferably at least one compound selected from the group consisting of: a compound (B)-1 represented by formula (2):

[Formula 10]

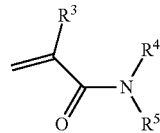

(2)

wherein $R^3$ is a hydrogen atom or a methyl group, $R^4$ and $R^5$ are each independently a hydrogen atom, an alkyl group, a hydroxyalkyl group, an alkoxyalkyl group, or a cyclic ether group, and $R^4$ and $R^5$ may form a heterocyclic ring; a compound (B)-2 represented by formula (3):

[Formula 11]

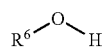

(3)

wherein $R^6$ is a hydrogen atom, an alkyl group, a hydroxyalkyl group, an alkoxyalkyl group, or a cyclic ether group, and may forma heterocyclic ring; a compound (B)-3 represented by formula (4):

[Formula 12]

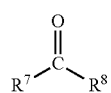

(4)

wherein $R^7$ and $R^8$ are each independently an amide group, an alkyl group, a hydroxyalkyl group, an alkoxyalkyl group, or a cyclic ether group, and may form a heterocyclic ring; and a compound (B)-4 represented by formula (5):

[Formula 13]

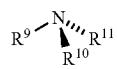

(5)

wherein $R^9$, $R^{10}$, and $R^{11}$ are each independently a hydrogen atom, a hydroxyl group, an alkyl group, a hydroxyalkyl group, an alkoxyalkyl group, or a cyclic ether group, and may form a heterocyclic ring.

The compound (B)-1 may be, for example, hydroxyethylacrylamide or N-methylolacrylamide. The compound (B)-2 may be, for example, water. The compound (B)-3 may be, for example, urea. The compound (B)-4 may be, for example, methylolmelamine. Among these compounds, methylolmelamine is particularly preferred as the adhesion aid compound (B) to be used.

The content of the adhesion aid compound (B) in the curable resin composition is preferably from 0.1 to 50% by weight, more preferably from 0.5 to 30% by weight, even more preferably from 1 to 20% by weight, in order to improve the adhesion and the water-resistant adhesion between the adhesive layer and a polarizer, specifically, in order to improve the adhesion and the water-resistant adhesion between a polarizer and a transparent protective film bonded together with the adhesive layer interposed therebetween.

<Additional Curable Component>

The adhesive layer of the invention is formed by curing the curable resin composition including at least the compound (A) and the adhesion aid compound (B) and further containing an additional curable component. The mode of curing the curable resin composition can be broadly classified into thermosetting and active energy ray curing. The thermosetting resin may be, for example, a polyvinyl alcohol resin, an epoxy resin, an unsaturated polyester, a urethane resin, an acrylic resin, a urea resin, a melamine resin, or a phenolic resin, if necessary, which may be used in combination with a curing agent. The thermosetting resin is more preferably a polyvinyl alcohol resin or an epoxy resin. The active energy ray-curable resin can be broadly classified into electron beam-curable, ultraviolet ray-curable, and visible ray-curable resins according to the type of active energy rays. The composition can also be classified into a radically polymerizable curable resin composition and a cationically polymerizable resin composition according to the mode of curing. In the invention, active energy rays in the wavelength range of 10 nm to less than 380 nm are referred to as ultraviolet rays, and active energy rays in the wavelength range of 380 nm to 800 nm are referred to as visible rays.

For the polarizing film production according to the invention, the composition is preferably active energy ray-curable as mentioned above. The composition is more preferably visible ray-curable, which can be cured using visible rays in the range of 380 nm to 450 nm.

<1 Radically Polymerizable Curable Resin Composition>

Curable components other than the compound (A) and the adhesion aid compound (B) may be, for example, radically polymerizable compounds for use in radically polymerizable curable resin compositions. The radically polymerizable compounds include compounds having a carbon-carbon double bond-containing radically polymerizable functional group, such as a (meth)acryloyl or vinyl group. The curable components may also be any of monofunctional and di- or polyfunctional radially-polymerizable compounds. These radically polymerizable compounds may be used singly or in combination of two or more. These radically polymerizable compounds are preferably, for example, (meth)acryloyl group-containing compounds. As used herein, the term "(meth)acryloyl" means an acryloyl group and/or a methacryloyl group, and hereinafter, "(meth)" will be used in the same meaning.

<<Monofunctional Radically Polymerizable Compound>>

The monofunctional radically polymerizable compound may be preferably a nitrogen-containing (meth)acrylate, examples of which include N-alkyl group-containing (meth)acrylamide derivatives such as N-methyl(meth)acrylamide, N,N-dimethyl(meth)acrylamide, N,N-diethyl(meth)acrylamide, N-isopropyl(meth)acrylamide, N-butyl(meth)acrylamide, and N-hexyl(meth)acrylamide; N-hydroxyalkyl group-containing (meth)acrylamide derivatives such as N-methylol-N-propane(meth)acrylamide; and N-alkoxy group-containing (meth)acrylamide derivatives such as N-methoxymethylacrylamide and N-ethoxymethylacrylamide. Examples also include cyclic ether group-containing (meth)acrylamide derivatives including heterocyclic ring-containing (meth)acrylamide derivatives, in which the nitrogen atom of the (meth)acrylamide group forms a heterocyclic ring, such as N-acryloylmorpholine, N-acryloylpiperidine, N-methacryloylpiperidine, and N-acryloylpyrrolidine. Among them, N-hydroxyethylacrylamide and N-acryloylmorpholine are preferably used because they are highly reactive, can form a cured product with a high elastic modulus, and can produce good adhesion to polarizers.

The content of the nitrogen-containing (meth)acrylate in the curable resin composition is preferably from 0.1 to 50% by weight, more preferably from 1 to 20% by weight, in order to form an adhesive layer with improved water resistance and improved adhesion to polarizers, particularly, in order to improve the adhesion and water resistance of the adhesive layer used to bond a polarizer and a transparent protective film.

The curable resin composition used in the invention may also contain another monofunctional radically polymerizable compound as a curable component other than the nitrogen-containing (meth)acrylate. Examples of such a monofunctional radically polymerizable compound include various (meth)acrylic acid derivatives having a (meth)acryloyloxy group. Specific examples include methyl (meth)acrylate, ethyl (meth)acrylate, n-propyl(meth)acrylate, isopropyl (meth)acrylate, 2-methyl-2-nitropropyl (meth)acrylate, n-butyl (meth)acrylate, isobutyl (meth)acrylate, sec-butyl (meth)acrylate, tert-butyl (meth)acrylate, n-pentyl (meth)acrylate, tert-pentyl (meth)acrylate, 3-pentyl (meth)acrylate, 2,2-dimethylbutyl (meth)acrylate, n-hexyl (meth)acrylate, cetyl (meth)acrylate, n-octyl (meth)acrylate, 2-ethylhexyl (meth)acrylate, 4-methyl-2-propylpentyl (meth)acrylate, n-octadecyl (meth)acrylate, and other C1-C20 alkyl (meth)acrylates.

Examples of the (meth)acrylic acid derivatives also include cycloalkyl (meth)acrylates such as cyclohexyl (meth)acrylate and cyclopentyl (meth)acrylate; aralkyl (meth)acrylates such as benzyl (meth)acrylate; polycyclic (meth)acrylates such as 2-isobornyl (meth)acrylate, 2-norbornylmethyl (meth)acrylate, 5-norbornene-2-yl-methyl (meth)acrylate, 3-methyl-2-norbornylmethyl (meth)acrylate, dicyclopentenyl (meth)acrylate, dicyclopentenyloxyethyl (meth)acrylate, and dicyclopentanyl (meth)acrylate; and alkoxy or phenoxy group-containing (meth)acrylates such as 2-methoxyethyl (meth)acrylate, 2-ethoxyethyl (meth)acrylate, 2-methoxymethoxyethyl (meth)acrylate, 3-methoxybutyl (meth)acrylate, ethyl carbitol (meth)acrylate, phenoxyethyl (meth)acrylate, and alkylphenoxy polyethylene glycol (meth)acrylate. Among them, dicyclopentenyloxyethylacrylate and phenoxyethyl acrylate are preferred because they can produce good adhesion to various protective films.

Examples of the (meth)acrylic acid derivatives also include hydroxyl group-containing (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, other hydroxyalkyl (meth)acrylates, [4-(hydroxymethyl)cyclohexyl]methyl acrylate, cyclohexanedimethanol mono(meth)acrylate, and 2-hydroxy-3-phenoxypropyl (meth)acrylate; epoxy group-containing (meth)acrylates such as glycidyl (meth)acrylate and 4-hydroxybutyl (meth)acrylate glycidyl ether; halogen-containing (meth)acrylates such as 2,2,2-trifluoroethyl (meth)acrylate, 2,2,2-trifluoroethylethyl (meth)acrylate, tetrafluoropropyl (meth)acrylate, hexafluoropropyl (meth)acrylate, octafluoropentyl (meth)acrylate, heptadecafluorodecyl (meth)acrylate, and 3-chloro-2-hydroxypropyl (meth)acrylate; alkylaminoalkyl (meth)acrylates such as dimethylaminoethyl (meth)acrylate; oxetane group-containing (meth)acrylates such as 3-oxetanylmethyl (meth)acrylate, 3-methyl-oxetanylmethyl (meth)acrylate, 3-ethyl-oxetanylmethyl (meth)acrylate, 3-butyl-oxetanylmethyl (meth)acrylate, and 3-hexyl-oxetanylmethyl (meth)acrylate; heterocyclic ring-containing (meth)acrylates such as tetrahydrofurfuryl (meth)acrylate and butyrolactone (meth)acrylate; and (meth)acrylic acid adducts of neopentylglycol hydroxypivalate, and p-phenylphenol (meth)acrylate. Among them, 2-hydroxy-3-phenoxypropyl acrylate is preferred because it can produce good adhesion to various protective films.

Examples of the monofunctional radically polymerizable compound also include carboxyl group-containing monomers such as (meth)acrylic acid, carboxyethyl acrylate, carboxypentyl acrylate, itaconic acid, maleic acid, fumaric acid, crotonic acid, and isocrotonic acid.

Examples of the monofunctional radically polymerizable compound also include vinyl lactam monomers such as N-vinylpyrrolidone, N-vinyl-ε-caprolactam, and methylvinylpyrrolidone; and nitrogen-containing-heterocyclic ring-containing vinyl monomers such as vinylpyridine, vinylpiperidone, vinylpyrimidine, vinylpiperazine, vinylpyrazine, vinylpyrrole, vinylimidazole, vinyloxazole, and vinylmorpholine.

The curable resin composition used in the invention can provide improved adhesion to various substrates when containing, for example, a hydroxyl group-containing (meth)acrylate, a carboxyl group-containing (meth)acrylate, or a phosphate group-containing (meth)acrylate, which has particularly high polarity among the monofunctional radically polymerizable compounds. The content of the hydroxyl group-containing (meth)acrylate is preferably from 1% by weight to 30% by weight based on the weight of the resin composition. If the content is too high, the resulting cured product may have high water absorption rate, which may degrade water resistance. The content of the carboxyl group-containing (meth)acrylate is preferably from 1% by weight to 20% by weight based on the weight of the resin composition. Too high a carboxyl group-containing (meth)acrylate content may cause a reduction in the optical durability of polarizing films and thus is not preferred. The phosphate group-containing (meth)acrylate may be 2-(meth)acryloyloxyethyl acid phosphate. The content of the phosphate group-containing (meth)acrylate is preferably from 0.1% by weight to 10% by weight based on the weight of the resin composition. Too high a phosphate group-containing (meth) acrylate content may cause a reduction in the optical durability of polarizing films and thus is not preferred.

A radically polymerizable compound having an active methylene group may also be used as the monofunctional radically polymerizable compound. The radically polymerizable compound having an active methylene group should be a compound having an active double-bond group such as a (meth)acrylic group at its end or in its molecule and also having an active methylene group. The active methylene group may be, for example, an acetoacetyl group, an alkoxymalonyl group, or a cyanoacetyl group. The active methylene group is preferably an acetoacetyl group. Examples of the radically polymerizable compound having an active methylene group include acetoacetoxyalkyl (meth)acrylates such as 2-acetoacetoxyethyl (meth)acrylate, 2-acetoacetoxypropyl (meth)acrylate, and 2-acetoacetoxy-1-methylethyl (meth)acrylate; 2-ethoxymalonyloxyethyl (meth)acrylate, 2-cyanoacetoxyethyl (meth)acrylate, N-(2-cyanoacetoxyethyl)acrylamide, N-(2-propionylacetoxybutyl)acrylamide, N-(4-acetoacetoxymethylbenzyl)acrylamide, and N-(2-acetoacetylaminoethyl)acrylamide. The radically polymerizable compound having an active methylene group is preferably an acetoacetoxyalkyl (meth)acrylate.

<<Polyfunctional Radically Polymerizable Compound>>

Examples of the di- or polyfunctional radically polymerizable compound include polyfunctional (meth)acrylamide derivatives such as N,N'-methylenebis(meth)acrylamide, tripropylene glycol di(meth)acrylate, tetraethylene glycol di(meth)acrylate, 1,6-hexanediol di(meth)acrylate, 1,9-nonanediol di(meth)acrylate, 1,10-decanediol diacrylate, 2-ethyl-2-butylpropanediol di(meth)acrylate, bisphenol A di(meth)acrylate, bisphenol A ethylene oxide adduct di(meth)acrylate, bisphenol A propylene oxide adduct di(meth)acrylate, bisphenol A diglycidyl ether di(meth)acrylate, neopentyl glycol di(meth)acrylate, tricyclodecanedimethanol di(meth)acrylate, cyclic trimethylolpropane formal (meth)acrylate, dioxane glycol di(meth)acrylate, trimethylolpropane tri(meth)acrylate, pentaerythritol tri(meth)acrylate, pentaerythritol tetra(meth)acrylate, dipentaerythritol penta (meth)acrylate, dipentaerythritol hexa(meth)acrylate, esters of (meth)acrylic acid with polyhydric alcohols, such as EO-modified diglycerin tetra(meth)acrylate, and 9,9-bis[4-(2-(meth)acryloyloxyethoxy)phenyl]fluorene Specific preferred examples include Aronix M-220 (manufactured by Toagosei Co., Ltd.), LIGHT ACRYLATE 1,9ND-A (manufactured by Kyoeisha Chemical Co., Ltd.), LIGHT ACRYLATE DGE-4A (manufactured by Kyoeisha Chemical Co., Ltd.), LIGHT ACRYLATE DCP-A (manufactured by Kyoeisha Chemical Co., Ltd.), SR-531 (manufactured by Sartomer), and CD-536 (manufactured by Sartomer). If necessary, any of various epoxy (meth)acrylates, urethane (meth)acrylates, or polyester (meth)acrylate, or any of various (meth)acrylate monomers may also be used. The polyfunctional (meth)acrylamide derivative is preferably added to the curable resin composition because it can provide a high polymerization rate and good productivity and also can achieve good crosslinking properties when a cured product is made from the resin composition.

Radically polymerizable compounds should be used to achieve both good adhesion between a polarizer and any transparent protective film and good optical durability in a harsh environment. For this purpose, the monofunctional radically polymerizable compound is preferably used in combination with the polyfunctional radically polymerizable compound. In general, they are preferably used together in a ratio of 3 to 80% by weight of the monofunctional radically polymerizable compound to 20 to 97% by weight of the polyfunctional radically polymerizable compound based on 100% by weight of the radically polymerizable compounds.

<Features of the Radically Polymerizable Curable Resin Composition>

The curable resin composition used in the invention may be used as an active energy ray-curable resin composition when the curable component used is curable with active energy rays. When electron beams are used as the active energy rays, the active energy ray-curable resin composition does not need to contain any photopolymerization initiator. However, when ultraviolet or visible rays are used as the active energy rays, the active energy ray-curable resin composition preferably contains a photopolymerization initiator.

<<Photopolymerization Initiator>>

The photopolymerization initiator for use with the radically polymerizable compound is appropriately selected in a manner depending on the active energy rays. When ultraviolet or visible rays are used for curing, an ultraviolet or visible ray-cleavable photopolymerization initiator may be used.

Examples of the photopolymerization initiator include benzophenone compounds such as benzil, benzophenone, benzoylbenzoic acid, and 3,3'-dimethyl-4-methoxybenzophenone; aromatic ketone compounds such as 4-(2-hydroxyethoxy)phenyl(2-hydroxy-2-propyl)ketone, α-hydroxy-α,α'-dimethylacetophenone, 2-methyl-2-hydroxypropiophenone, and α-hydroxycyclohexyl phenyl ketone; acetophenone compounds such as methoxyacetophenone, 2,2-dimethoxy-2-phenylacetophenone, 2,2-diethoxyacetophenone, and 2-methyl-1-[4-(methylthio)-phenyl]-2-morpholinopropane-1-one; benzoin ether compounds such as benzoin methyl ether, benzoin ethyl ether, benzoin isopropyl ether, benzoin butyl ether, and anisoin methyl ether; aromatic ketal compounds such as benzyl dimethyl ketal; aromatic sulfonyl chloride compounds such as 2-naphthalenesulfonyl chloride; optically active oxime compounds such as 1-phenyl-1,1-propanedione-2-(o-ethoxycarbonyl)oxime; thioxanthone compounds such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, and dodecylthioxanthone; camphorquinone; halogenated ketones; acylphosphine oxide; and acylphosphonate.

The content of the photopolymerization initiator may be 20% by weight or less based on the total amount of the curable resin composition. The content of the photopolymerization initiator is preferably from 0.01 to 20% by weight, more preferably from 0.05 to 10% by weight, even more preferably from 0.1 to 5% by weight.

When the curable resin composition used in the invention is a visible ray-curable resin composition containing the radically polymerizable compound as a curable component, a photopolymerization initiator having high sensitivity to light of 380 nm or longer is preferably used in the composition. The photopolymerization initiator having high sensitivity to light of 380 nm or longer will be described later.

A compound represented by formula (6):

[Formula 14]

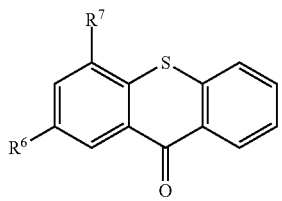

(6)

wherein $R^6$ and $R^7$ each represent —H, —CH$_2$CH$_3$, -i-Pr, or Cl, and $R^6$ and $R^7$ may be the same or different, is preferably used alone as the photopolymerization initiator, or the compound represented by formula (6) is preferably used as the photopolymerization initiator in combination with another photopolymerization initiator having high sensitivity to light of 380 nm or longer described below. The resulting adhesion is higher when the compound of formula (6) is used than when a photopolymerization initiator having high sensitivity to light of 380 nm or longer is used alone. In particular, the compound of formula (6) is preferably diethyl thioxanthone in which $R^6$ and $R^7$ are each —CH$_2$CH$_3$. The content of the compound of formula (6) in the curable resin composition is preferably from 0.1 to 5% by weight, more preferably from 0.5 to 4% by weight, even more preferably from 0.9 to 3% by weight, based on the total amount of the curable resin composition.

If necessary, a polymerization initiation aid is preferably added to the composition. In particular, the polymerization initiation aid is preferably triethylamine, diethylamine, N-methyldiethanolamine, ethanolamine, 4-dimethylaminobenzoic acid, methyl 4-dimethylaminobenzoate, ethyl 4-dimethylaminobenzoate, or isoamyl 4-dimethylaminobenzoate. Ethyl 4-dimethylaminobenzoate is particularly preferred. When the polymerization initiation aid is used, the content of the aid is generally 0 to 5% by weight, preferably 0 to 4% by weight, most preferably 0 to 3% by weight, based on the total amount of the curable resin composition.

If necessary, a known photopolymerization initiator may also be used in combination. Since the transparent protective film having the ability to absorb UV does not transmit light of 380 nm or shorter, such a photopolymerization initiator should preferably have high sensitivity to light of 380 nm or longer. Examples of such an initiator include 2-methyl-1-(4-methylthiophenyl)-2-morpholinopropan-1-on, 2-benzyl-2-dimethylamino-1-(4-morpholinophenyl)-butanone-1, 2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, and bis(η5-2,4-cyclopentadien-1-yl)-bis(2,6-difluoro-3-(1H-pyrrol-1-yl)-phenyl)titanium.

In particular, a compound represented by formula (7):

[Formula 15]

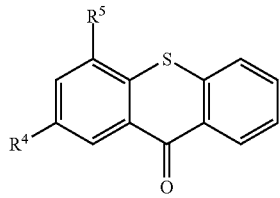

(7)

wherein $R^8$, $R^9$, and $R^{10}$ each represent —H, —CH$_3$, —CH$_2$CH$_3$, -i-Pr, or Cl, and $R^8$, $R^9$, and $R^{10}$ may be the same or different, is preferably used in addition to the photopolymerization initiator of formula (6). Commercially available 2-methyl-1-(4-methylthiophenyl)-2-morpholinopropan-1-on (IRGACURE 907 (trade name) manufactured by BASF) is advantageously used as the compound of formula (7). Besides this, 2-benzyl-2-dimethylamino-1-(4-morpholinophenyl)-butanone-1 (IRGACURE 369 (trade name) manufactured by BASF) and 2-(dimethylamino)-2-[(4-methylphenyl)methyl]-1-[4-(4-morpholinyl)phenyl]-1-butanone (IRGACURE 379 (trade name) manufactured by BASF) are preferred because of their high sensitivity.

<Radically Polymerizable Compound Having Active Methylene Group and Radical Polymerization Initiator Having Hydrogen-Withdrawing Function>

In the active energy ray-curable resin composition, the radically polymerizable compound having an active methylene group is preferably used in combination with a radical polymerization initiator having a hydrogen-withdrawing function. This feature can provide significantly improved adhesion for the adhesive layer of a polarizing film even immediately after the polarizing film is particularly taken out of a high-humidity environment or water (undried conditions). Although the reason for this is not clear, the following factors can be considered. The radically polymerizable compound having an active methylene group can be polymerized together with other radically polymerizable compounds used to form the adhesive layer. During the polymerization for forming the adhesive layer, the radically polymerizable compound having an active methylene group can be incorporated into the main chain and/or the side chain of the base polymer in the adhesive layer. When the radical polymerization initiator having a hydrogen-withdrawing function is present in this polymerization process, hydrogen can be withdrawn from the radically polymerizable compound having an active methylene group so that a radical can be generated on the methylene group in the process of forming the base polymer for the adhesive layer. The radical-carrying methylene group can react with hydroxyl groups in a polarizer made of PVA or the like, so that covalent bonds can be formed between the adhesive layer and the polarizer. This may result in a significant improvement in the adhesion of the adhesive layer of the polarizing film particularly even in an undried state.

In the invention, the radical polymerization initiator having a hydrogen-withdrawing function may be, for example, a thioxanthone radical polymerization initiator or a benzophenone radical polymerization initiator. The radical polymerization initiator is preferably a thioxanthone radical polymerization initiator. The thioxanthone radical polymerization initiator is preferably, for example, a compound of formula (6) above. Examples of the compound of formula (6) include thioxanthone, dimethyl thioxanthone, diethyl thioxanthone, isopropyl thioxanthone, and chlorothioxanthone. In particular, the compound of formula (6) is preferably diethyl thioxanthone in which $R^6$ and $R^7$ are each —$CH_2CH_3$.

When the active energy ray-curable resin composition contains the radically polymerizable compound having an active methylene group and the radical polymerization initiator having a hydrogen-withdrawing function, the composition preferably contains 1 to 50% by weight of the radically polymerizable compound having an active methylene group and 0.1 to 10% by weight of the radical polymerization initiator based on 100% by weight of the total amount of the curable components.

In the invention, as described above, the reaction of the radically polymerizable compound having an active methylene group in the presence of the radical polymerization initiator having a hydrogen-withdrawing function produces a radical on the methylene group, which reacts with the hydroxyl group in the polarizer made of PVA or the like to form a covalent bond. Thus, to produce a radical on the methylene group of the radically polymerizable compound having an active methylene group so that the covalent bond can be sufficiently formed, the composition preferably contains 1 to 50% by weight, more preferably 3 to 30% by weight of the radically polymerizable compound having an active methylene group based on 100% by weight of the total amount of the curable components. The content of the radically polymerizable compound having an active methylene group is preferably 1% by weight or more in order to sufficiently improve water resistance and to improve the adhesion under undried conditions. On the other hand, if the content is more than 50% by weight, the adhesive layer may be insufficiently cured. The curable resin composition preferably contains 0.1 to 10% by weight, more preferably 0.3 to 9% by weight of the radical polymerization initiator having a hydrogen-withdrawing function based on the total amount of the curable resin composition. To allow the hydrogen withdrawing reaction to proceed sufficiently, it is preferable to use 0.1% by weight or more of the radical polymerization initiator. On the other hand, if it is more than 10% by weight, the initiator may fail to dissolve completely in the composition.

<2. Cationically Polymerizable Curable Resin Composition>

The cationically polymerizable compound for use in the cationically polymerizable curable resin composition can be classified into a monofunctional cationically polymerizable compound having one Cationically polymerizable functional group in the molecule and a polyfunctional cationically polymerizable compound having two or more cationically polymerizable functional groups in the molecule. The monofunctional cationically polymerizable compound has relatively low liquid viscosity and thus can reduce the liquid viscosity of the resin composition when added to the resin composition. Many monofunctional cationically polymerizable compounds have a functional group capable of serving various functions. When the resin composition contains any of such compounds, the resin composition and/or the curing product of the resin composition can have various functions. The polyfunctional cationically polymerizable compound, which can three-dimensionally crosslink the curing product of the resin composition, is preferably added to the resin composition. The monofunctional cationically polymerizable compound and the polyfunctional cationically polymerizable compound are preferably mixed in a ratio of 100 parts by weight of the former to 10 to 1,000 parts by weight of the latter. The cationically polymerizable functional group may be an epoxy group, an oxetanyl group, or a vinyl ether group. Examples of epoxy group-containing compounds include aliphatic epoxy compounds, alicyclic epoxy compounds, and aromatic epoxy compounds. Particularly, in the invention, the cationically polymerizable curable resin composition preferably contains an alicyclic epoxy compound, which can provide good curing properties and adhesion. Examples of such an alicyclic epoxy compound include 3,4-epoxycyclohexylmethyl-3,4-epoxycyclohexanecarboxylate and products obtained by modifying 3,4-epoxycyclohexylmethyl-3,4-epoxycyclohexanecarboxylate with caprolactone, trimethylcaprolactone, or valerolactone. Specific examples thereof include CELLOXIDE 2021, CELLOXIDE 2021A, CELLOXIDE 2021P, CELLOXIDE 2081, CELLOXIDE 2083, and CELLOXIDE 2085 (all manufactured by Daicel Corporation) and CYRACURE UVR-6105, CYRACURE UVR-6107, CYRACURE 30, and R-6110 (all manufactured by Dow Chemical Japan Limited). In the invention, the cationically polymerizable curable resin composition preferably contains an oxetanyl group-containing compound, which is effective in improving the curing properties of the composition or reducing the liquid viscosity of the composition. Examples of such an oxetanyl group-containing compound include 3-ethyl-3-hydroxymethyloxetane, 1,4-bis[(3-ethyl-3-oxetanyl)methoxymethyl] benzene, 3-ethyl-3-(phenoxymethyl)oxetane, di[(3-ethyl-3-oxetanyl)methyl]ether, 3-ethyl-3-(2-ethylhexyloxymethyl) oxetane, and phenol novolac oxetane. Examples of commercially available products thereof include ARON OXETANE OXT-101, ARON OXETANE OXT-121, ARON OXETANE OXT-211, ARON OXETANE OXT-221, and ARON OXETANE OXT-212 (all manufactured by Toagosei Co., Ltd.). In the invention, the cationically polymerizable curable resin composition preferably contains a vinyl ether group-containing compound, which is effective in improving the curing properties of the composition or reducing the liquid viscosity of the composition. Examples of such a vinyl ether group-containing compound include 2-hydroxyethyl vinyl ether, diethylene glycol monovinyl ether, 4-hydroxybutyl vinyl ether, diethylene glycol monovinyl ether, triethylene glycol divinyl ether, cyclohexanedimethanol divinyl ether, cyclohexanedimethanol monovinyl ether, tricyclodecane vinyl ether, cyclohexyl vinyl ether, methoxyethyl vinyl ether, ethoxyethyl vinyl ether, and pentaerythritol tetravinyl ether.

<Photo-Cationic Polymerization Initiator>

When the cationically polymerizable curable resin composition contains, as a curable component, at least one compound selected from the epoxy group-containing compound, the oxetanyl group-containing compound, and the vinyl ether group-containing compound described above, a photo-cationic polymerization initiator should be added to the composition because these compounds are all curable by cationic polymerization. When irradiated with active energy rays such as visible rays, ultraviolet rays, X-rays, or electron beams, the photo-cationic polymerization initiator generates a cationic species or a Lewis acid to initiate the polymerization reaction of the epoxy group or the oxetanyl group. The photo-acid generator described below is preferably used as the photo-cationic polymerization initiator. When the curable resin composition used in the invention is visible ray-curable, it is preferable to use a photo-cationic polymerization initiator with high sensitivity particularly to light of 380 nm or more. Unfortunately, a common photo-cationic polymerization initiator is a compound having maximum absorption in a wavelength region near or below 300 nm. Therefore, a photosensitizer having maximum absorption of light at a wavelength longer than such a wavelength region, specifically, longer than 380 nm should be added to the composition, so that it can accelerate the generation of a cationic species or an acid from the photo-cationic polymerization initiator by responding to light at a wavelength around that wavelength. Examples of the photosensitizer include anthracene compounds, pyrene compounds, carbonyl compounds, organosulfur compounds, persulfides, redox compounds, azo and diazo compounds, halogen compounds, and photo-reducing pigments. A mixture of two or more of these compounds may be also used. Anthracene compounds are particularly preferred because of their high photosensitizing effect. Specific examples of such compounds include ANTHRACURE UVS-1331 and ANTHRACUREUVS-1221 (manufactured by Kawasaki Kasei Chemicals Ltd.). The content of the photosensitizer is preferably from 0.1% by weight to 5% by weight, more preferably from 0.5% by weight to 3% by weight.

<Other Components>

The curable resin composition used in the invention preferably contains the components described below.

<Acryl-Based Oligomer>

The active energy ray-curable resin composition used in the invention may contain an acryl-based oligomer, which is formed by polymerization of a (meth)acrylic monomer, in addition to the radically polymerizable compound as a curable component. The acryl-based oligomer in the active energy ray-curable resin composition can reduce curing shrinkage in the process of irradiating and curing the composition with active energy rays and can also reduce the interface stress between the adhesive and adherends such as a polarizer and a transparent protective film. This makes it possible to suppress the reduction in the adhesion between the adhesive layer and the adherend. The content of the acryl-based oligomer is preferably 20% by weight or less, more preferably 15% by weight or less, based on the total amount of the curable resin composition in order to sufficiently suppress the curing shrinkage of the curing product layer (adhesive layer). If the content of the acryl-based oligomer in the curable resin composition is too high, a sharp reduction in reaction rate may occur to cause insufficient curing when the composition is irradiated with active energy rays. On the other hand, the content of the acryl-based oligomer is preferably 3% by weight or more, more preferably 5% by weight or more, based on the total amount of the curable resin composition.

In view of workability or uniformity during coating, the active energy ray-curable resin composition preferably has low viscosity. Therefore, the acryl-based oligomer formed by polymerization of a (meth)acrylic monomer also preferably has low viscosity. The acryl-based oligomer that has low viscosity and can prevent curing shrinkage of the adhesive layer preferably has a weight average molecular weight (Mw) of 15,000 or less, more preferably 10,000 or less, even more preferably 5,000 or less. On the other hand, to suppress curing shrinkage of the curing product layer (adhesive layer), the acryl-based oligomer preferably has a weight average molecular weight (Mw) of 500 or more, more preferably 1,000 or more, even more preferably 1,500 or more. Examples of the (meth)acrylic monomer that may be used to form the acryl-based oligomer include (C1 to C20) alkyl (meth)acrylates such as methyl (meth)acrylate, ethyl (meth)acrylate, n-propyl (meth)acrylate, isopropyl (meth)acrylate, 2-methyl-2-nitropropyl (meth)acrylate, n-butyl (meth)acrylate, isobutyl (meth)acrylate, sec-butyl (meth)acrylate, tert-butyl (meth)acrylate, n-pentyl (meth)acrylate, tert-pentyl (meth)acrylate, 3-pentyl (meth)acrylate, 2,2-dimethylbutyl (meth)acrylate, n-hexyl (meth)acrylate, cetyl (meth)acrylate, n-octyl (meth)acrylate, 2-ethylhexyl (meth)acrylate, 4-methyl-2-propylpentyl (meth)acrylate, and n-octadecyl (meth)acrylate; cycloalkyl (meth)acrylates (e.g., cyclohexyl (meth)acrylate and cyclopentyl (meth)acrylate); aralkyl (meth)acrylates (e.g., benzyl (meth)acrylate); polycyclic (meth)acrylates (e.g., 2-isobornyl (meth)acrylate, 2-norbornylmethyl (meth)acrylate, 5-norbornen-2-yl-methyl (meth)acrylate, and 3-methyl-2-norbornylmethyl (meth)acrylate); hydroxyl group-containing (meth)acrylates (e.g., hydroxyethyl (meth)acrylate, 2-hydroxypropyl (meth)acrylate, and 2,3-dihydroxypropylmethyl-butyl (meth)acrylate); alkoxy group- or phenoxy group-containing (meth)acrylates (e.g., 2-methoxyethyl (meth)acrylate, 2-ethoxyethyl (meth)acrylate, 2-methoxymethoxyethyl (meth)acrylate, 3-methoxybutyl (meth)acrylate, ethylcarbitol (meth)acrylate, and phenoxyethyl (meth)acrylate); epoxy group-containing (meth)acrylates (e.g., glycidyl (meth)acrylate); halogen-containing (meth)acrylates (e.g., 2,2,2-trifluoroethyl (meth)acrylate, 2,2,2-trifluoroethylethyl (meth)acrylate, tetrafluoropropyl (meth)acrylate, hexafluoropropyl (meth)acrylate, octafluoropentyl (meth)acrylate, and heptadecafluorodecyl (meth)acrylate); and alkylaminoalkyl (meth)acrylates (e.g., dimethylaminoethyl (meth)acrylate). These (meth)acrylates may be used singly or in combination of two or more. Examples of the acryl-based oligomer include ARUFON manufactured by Toagosei Co., Ltd., Actflow manufactured by Soken Chemical & Engineering Co., Ltd., and JONCRYL manufactured by BASF Japan Ltd.

<Photo-Acid Generator>

The active energy ray-curable resin composition may contain a photo-acid generator. The use of the active energy ray-curable resin composition containing a photo-acid generator makes it possible to form an adhesive layer with a dramatically higher level of water resistance and durability than the use of the active energy ray-curable resin composition containing no photo-acid generator. The photo-acid generator may be represented by formula (8) below.

Formula (8):

$$L^+X^-  \quad \text{[Formula 16]}$$

wherein $L^+$ represents any onium cation, and $X^-$ represents a counter anion selected from the group consisting of $PF_6^-$, $SbF_6^-$, $AsF_6^-$, $SbCl_6^-$, $BiCl_5^-$, $SnCl_6^-$, $ClO_4^-$, dithiocarbamate anion, and $SCN^-$.

Next, the counter anion $X^-$ in formula (8) will be described.

Although not limited in principle, the counter anion $X^-$ in formula (8) is preferably a non-nucleophilic anion. When the counter anion $X^-$ is a non-nucleophilic anion, nucleophilic reaction is less likely to occur with the coexisting cation in the molecule or with various materials used in combination with the anion, so that the photo-acid generator of formula (8) itself and the composition containing it can have improved stability over time. As used herein, the term "non-nucleophilic anion" refers to an anion less capable of undergoing nucleophilic reaction. Examples of such an anion include $PF_6^-$, $SbF_6^-$, $AsF_6^-$, $SbCl_6^-$, $BiCl_5^-$, $SnCl_6^-$, $ClO_4^-$, dithiocarbamate anion, and $SCN^-$.

Specifically, preferred examples of the photo-acid generator in the invention include CYRACUREUVI-6992 and CYRACURE UVI-6974 (all manufactured by Dow Chemical Japan Limited), ADEKA OPTOMER SP150, ADEKA OPTOMER SP152, ADEKA OPTOMER SP170, and ADEKA OPTOMER SP172 (all manufactured by ADEKA CORPORATION), IRGACURE 250 (manufactured by Ciba Specialty Chemicals Inc.), CI-5102 and CI-2855 (all manufactured by Nippon Soda Co., Ltd.), SAN-AID SI-60L, SAN-AID SI-80L, SAN-AID SI-100L, SAN-AID SI-110L, and SAN-AID SI-180L (all manufactured by SANSHIN CHEMICAL INDUSTRY CO., LTD.), CPI-100P and CPI-100A (all manufactured by SAN-APRO LTD.), and WPI-069, WPI-113, WPI-116, WPI-041, WPI-044, WPI-054, WPI-055, WPAG-281, WPAG-567, and WPAG-596 (all manufactured by Wako Pure Chemical Industries, Ltd.).

The content of the photo-acid generator is preferably from 0.01 to 10% by weight, more preferably from 0.05 to 5% by weight, even more preferably from 0.1 to 3% by weight, based on the total amount of the curable resin composition.

<Compound Containing Either Alkoxy Group or Epoxy Group>

The active energy-ray curable resin composition may contain the photo-acid generator together with a compound containing either an alkoxy group or an epoxy group.

(Epoxy Group-Containing Compound and Polymer)

A compound having one or more epoxy groups per molecule or a polymer (epoxy resin) having two or more epoxy groups per molecule may be used. In this case, a compound having two or more functional groups per molecule reactive with an epoxy group may be used in combination with the epoxy group-containing compound or polymer. The functional group reactive with an epoxy group may be, for example, carboxyl, phenolic hydroxyl, mercapto, or primary or secondary aromatic amino. In particular, the compound preferably has two or more functional groups of any of these types per molecule in view of three-dimensionally curing properties.

Examples of polymers having one or more epoxy groups per molecule include epoxy resins such as bisphenol A epoxy resins derived from bisphenol A and epichlorohydrin, bisphenol F epoxy resins derived from bisphenol F and epichlorohydrin, bisphenol S epoxy resins, phenol novolac epoxy resins, cresol novolac epoxy resins, bisphenol A novolac epoxy resins, bisphenol F novolac epoxy resins, alicyclic epoxy resins, diphenyl ether epoxy resins, hydroquinone epoxy resins, naphthalene epoxy resins, biphenyl epoxy resins, fluorene epoxy resins, polyfunctional epoxy resins such as trifunctional epoxy resins and tetrafunctional epoxy resins, glycidyl ester epoxy resins, glycidyl amine epoxy resins, hydantoin epoxy resins, isocyanurate epoxy resins, and aliphatic chain epoxy resins. These epoxy resins may be halogenated or hydrogenated. Examples of commercially available epoxy resin products include, but are not limited to, JER Code 828, 1001, 801N, 806, 807, 152, 604, 630, 871, YX8000, YX8034, and YX4000 manufactured by Japan Epoxy Resins Co., Ltd., EPICLON 830, EPICLON EXA-835LV, EPICLON HP-4032D, and EPICLON HP-820 manufactured by DIC Corporation, EP4100 series, EP4000 series, and EPU series manufactured by ADEKA CORPORATION, CELLOXIDE series (e.g., 2021, 2021P, 2083, 2085, and 3000), EPOLEAD series, and EHPE series manufactured by DAICEL CORPORATION, YD series, YDF series, YDCN series, YDB series, and phenoxy resins (polyhydroxypolyethers synthesized from bisphenols and epichlorohydrin and terminated at both ends with epoxy groups, e.g., YP series) manufactured by NIPPON STEEL & SUMIKIN CHEMICAL CO., LTD., DENACOL series manufactured by Nagase ChemteX Corporation, and Epolite series manufactured by Kyoeisha Chemical Co., Ltd. These epoxy resins may be used in combination of two or more.

(Alkoxyl Group-Containing Compound and Polymer)

The compound having an alkoxyl group in the molecule may be any known compound having at least one alkoxyl group per molecule. Such a compound is typically a melamine compound, an amino resin, or a silane coupling agent.

The content of the compound having either an alkoxy group or an epoxy group is generally 30% by weight or less based on the total amount of the curable resin composition. If the content of the compound in the composition is too high, the composition may provide reduced adhesion or degraded impact resistance to drop testing. The content of the compound in the composition is preferably 20% by weight or less. On the other hand, in view of water resistance, the content of the compound in the composition is preferably 2% by weight or more, more preferably 5% by weight or more.

<Silane Coupling Agent>

When the curable resin composition used in the invention is active energy ray-curable, a silane coupling agent may be used, which is preferably an active energy ray-curable compound. However, even when not active energy ray-curable, a silane coupling agent can also impart a similar level of water resistance.

Examples of silane coupling agents as active energy ray-curable compounds include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

Preferred are 3-methacryloxypropyltrimethoxysilane and 3-acryloxypropyltrimethoxysilane.

Examples of non-active-energy-ray-curable silane coupling agents are preferably amino group-containing silane coupling agents. Examples of amino group-containing silane coupling agents include amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl) aminopropyltrimethoxysilane, γ-(2-aminoethyl) aminopropylmethyldimethoxysilane, γ-(2-aminoethyl) aminopropyltriethoxysilane, γ-(2-aminoethyl) aminopropylmethyldiethoxysilane, γ-(2-aminoethyl) aminopropyltriisopropoxysilane, γ-(2-(2-aminoethyl) aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine; and ketimine silanes such as N-(1,3-dimethylbutylidene)-3-(triethoxysilyl)-1-propaneamine.

These amino group-containing silane coupling agents may be used singly or in combination of two or more. Among them, γ-aminopropyltrimethoxysilane, γ-(2-aminoethyl)aminopropyltrimethoxysilane, γ-(2-aminoethyl) aminopropylmethyldimethoxysilane, γ-(2-aminoethyl) aminopropyltriethoxysilane, γ-(2-aminoethyl) aminopropylmethyldiethoxysilane, and N-(1,3-dimethylbutylidene)-3-(triethoxysilyl)-1-propaneamine are preferred in order to ensure good adhesion.

The content of the silane coupling agent is preferably in the range of 0.01 to 20% by weight, more preferably 0.05 to 15% by weight, even more preferably 0.1 to 10% by weight, based on the total amount of the curable resin composition. If the content is more than 20% by weight, the curable resin composition may have degraded storage stability, and if the content is less than 0.1% by weight, the water-resistant adhesion effect may fail to be sufficiently produced.

Examples of non-active-energy-ray-curable silane coupling agents other than the above include 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, and imidazolesilane.

<Vinyl Ether Group-Containing Compound>

The curable resin composition used in the invention preferably contains a vinyl ether group-containing compound, so that the resulting adhesive layer can have improved water-resistant adhesion to a polarizer. Although it is not clear why this effect can be obtained, one reason may be that the vinyl ether group of the compound can interact with a polarizer so that the resulting adhesive layer can have an increased adhering strength. In order to make more water-resistant the adhesion between the polarizer and the adhesive layer, the compound should preferably be a vinyl ether group-containing, radically polymerizable compound. The content of the compound is preferably from 0.1 to 19% by weight based on the total amount of the curable resin composition.

<Organometallic Compound>

The curable resin composition used in the invention may contain an organometallic compound. The organometallic compound contained in the curable resin composition can further enhance the effect of the invention, specifically, can further enhance the water resistance of a polarizing film under harsh conditions.

The organometallic compound is preferably at least one selected from the group consisting of a metal alkoxide and a metal chelate. The metal alkoxide may be a compound having at least one alkoxy group, as an organic group, bonded to metal. The metal chelate may be a compound having an organic group bonded or coordinated to metal with an oxygen atom between them. The metal is preferably titanium, aluminum, or zirconium. In particular, aluminum and zirconium are more rapidly reactive than titanium and may shorten the pot life of the adhesive composition and reduce the effect of improving water-resistant adhesion. Therefore, the metal for the organometallic compound is more preferably titanium for the improvement of the water-resistant adhesion of the adhesive layer.

When the curable resin composition according to the invention contains a metal alkoxide as the organometallic compound, the metal alkoxide preferably has an organic group of 4 or more carbon atoms, more preferably 6 or more carbon atoms. If the organic group has 3 or less carbon atoms, the curable resin composition may have a shorten pot life, and the water-resistant adhesion may be less effectively improved. The organic group of 6 or more carbon atoms may be, for example, an octoxy group, which is preferably used. Preferred examples of the metal alkoxide include tetraisopropyl titanate, tetra-n-butyl titanate, butyl titanate dimer, tetraoctyl titanate, tert-amyl titanate, tetra-tert-butyl titanate, tetrastearyl titanate, zirconium tetraisopropoxide, zirconium tetra-n-butoxide, zirconium tetraoctoxide, zirconium tetra-tert-butoxide, zirconium tetrapropoxide, aluminum sec-butylate, aluminum ethylate, aluminum isopropylate, aluminum butylate, aluminum diisopropylate mono-sec-butylate, and mono-sec-butoxy aluminum diisopropylate. In particular, tetraoctyl titanate is preferred.

When the curable resin composition according to the invention contains a metal chelate as the organometallic compound, the metal chelate preferably has an organic group of 4 or more carbon atoms. If the organic group has 3 or less carbon atoms, the curable resin composition may have a shorten pot life, and the water-resistant adhesion may be less effectively improved. The organic group of 4 or more carbon atoms may be, for example, an acetylacetonate group, an ethylacetoacetate group, an isostearate group, or an octyleneglycolate group. Among them, the organic group is preferably an acetylacetonate group or an ethylacetoacetate group in view of the water-resistant adhesion of the adhesive layer. Preferred examples of the metal chelate include titanium acetylacetonate, titanium octyleneglycolate, titanium tetraacetylacetonate, titanium ethylacetoacetate, polyhydroxytitanium stearate, dipropoxy-bis(acetylacetonato) titanium, dibutoxytitanium-bis (octyleneglycolate), dipropoxytitanium-bis (ethylacetoacetate), titanium lactate, titanium diethanolaminate, titanium triethanolaminate, dipropoxytitanium-bis(lactate), dipropoxytitanium-bis(triethanolaminate), di-n-butoxytitanium-bis(triethanolaminate), tri-n-butoxytitanium monostearate, diisopropoxybis (ethylacetoacetate)titanium, diisopropoxybis(acetylacetate) titanium, diisopropoxybis(acetylacetone)titanium, phosphate-titanium compounds, titanium lactate ammonium salt, titanium-1,3-propanedioxybis(ethylacetoacetate), dodecylbenzenesulfonate-titanium compounds, titanium aminoethylaminoethanolate, zirconium tetraacetylacetonate, zirconium monoacetylacetonate, zirconium bisacetylacetonate, zirconium acetylacetonate bisethylacetoacetate, zirconium acetate, tri-n-butoxyethylacetoacetate zirconium, di-n-butoxybis(ethylacetoacetate)ziconium, n-butoxytris (ethylacetoacetate)zirconium, tetrakis(n-propylacetoacetate)

zirconium, tetrakis(acetylacetoacetate)zirconium, tetrakis (ethylacetoacetate)zirconium, aluminum ethylacetoacetate, aluminum acetylacetonate, aluminum acetylacetonate bisethylacetoacetate, diisopropoxyethylacetoacetate aluminum, diisopropoxyacetylacetonate aluminum, isopropoxybis (ethylacetoacetate)aluminum, isopropoxybis(acetylacetonate)aluminum, tris(ethylacetoacetate)aluminum, tris(acetylacetonate)aluminum, and aluminum monoacetylacetonate bis(ethylacetoacetate). In particular, titanium acetylacetonate and titanium ethylacetoacetate are preferred.

Besides the above, examples of the organometallic compound that may be used in the invention include metal salts of organic carboxylic acids, such as zinc octoate, zinc laurate, zinc stearate, and tin octoate; and zinc chelate compounds such as zinc acetylacetone chelate, zinc benzoylacetone chelate, zinc dibenzoylmethane chelate, and zinc ethyl acetoacetate chelate.

In the invention, the content of the organometallic compound is preferably in the range of 0.05 to 9 parts by weight, more preferably in the range of 0.1 to 8 parts by weight, even more preferably in the range of 0.15 to 5 parts by weight, based on 100 parts by weight of the total amount of the active energy ray-curable components. If the content of the organometallic compound is more than 9 parts by weight, the adhesive composition may have degraded storage stability, or the content of the components for bonding to polarizers or protective films may be relatively insufficient, which may lead to reduced adhesion. If the content of the organometallic compound is less than 0.05 parts by weight, the water-resistant adhesion effect may be insufficiently produced.

<Compound Capable of Undergoing Keto-Enol Tautomerism>

The curable resin composition used in the invention may contain a compound capable of undergoing keto-enol tautomerism. In a preferred mode, for example, the compound capable of undergoing keto-enol tautomerism may be added to the curable resin composition containing a crosslinking agent or to the curable resin composition to be used together with a crosslinking agent. This makes it possible to suppress, after the addition of the organometallic compound, an excessive increase in the viscosity of the curable resin composition, gelation of the curable resin composition, and production of a microgel, so that the pot-life of the composition can be effectively extended.

Any of various β-dicarbonyl compounds may be used as the compound capable of undergoing keto-enol tautomerism. Examples include β-diketones such as acetyl acetone, 2,4-hexanedione, 3,5-heptanedione, 2-methylhexan-3,5-dione, 6-methylheptan-2,4-dione, and 2,6-dimethylheptan-3,5-dione; acetoacetic esters such as methyl acetoacetate, ethyl acetoacetate, isopropyl acetoacetate, and tert-butyl acetoacetate; propionyl acetate esters such as ethyl propionyl acetate, isopropyl propionyl acetate, and tert-butyl propionyl acetate; isobutyryl acetate esters such as ethyl isobutyryl acetate, isobutyryl ethyl acetate, isopropyl isobutyryl acetate, and tert-butyl isobutyryl acetate; and malonic esters such as methyl malonate and ethyl malonate. Particularly preferred compounds include acetyl acetone and acetoacetic esters. These compounds capable of undergoing keto-enol tautomerism may be used singly or in combination of two or more.

The compound capable of undergoing keto-enol tautomerism may be used in an amount of, for example, 0.05 to 10 parts by weight, preferably 0.2 to 3 parts by weight (e.g., from 0.3 to 2 parts by weight) based on 1 part by weight of the organometallic compound. If the compound is used in an amount of less than 0.05 parts by weight based on 1 part by weight of the organometallic compound, it may be difficult to sufficiently produce the effect of the use of the compound. On the other hand, if the compound is used in an amount of more than 10 parts by weight based on 1 part by weight of the organometallic compound, it may excessively interact with the organometallic compound to make it difficult to produce the desired water resistance.

<Additives Other than the Above>

The active energy ray-curable resin composition used in the invention may also contain any of various additives as other optional components as long as the objects and effects of the invention are not impaired. Examples of such additives include polymers or oligomers such as epoxy resin, polyamide, polyamide imide, polyurethane, polybutadiene, polychloroprene, polyether, polyester, styrene-butadiene block copolymers, petroleum resin, xylene resin, ketone resin, cellulose resin, fluorooligomers, silicone oligomers, and polysulfide oligomers, polymerization inhibitors such as phenothiazine and 2,6-di-tert-butyl-4-methylphenol, polymerization initiation aids, leveling agents, wettability modifiers, surfactants, plasticizers, ultraviolet absorbers, inorganic fillers, pigments, and dyes.

The content of these additives is generally 0 to 10% by weight, preferably 0 to 5% by weight, most preferably 0 to 3% by weight, based on the total amount of the curable resin composition.

In view of safety, less skin irritant materials are preferably used as the curable components for the curable resin composition used in the invention. The skin irritation can be evaluated with an index called primary irritation index (P.I.I.). P.I.I., which is measured by Draize method, is widely used to indicate the degree of skin disorders. The measured values are indicated on a scale of 0 to 8, and a lower value indicates lower irritant properties. P.I.I. values should be taken as reference values because of relatively large measurement errors. The P.I.I. of the components is preferably 4 or less, more preferably 3 or less, most preferably 2 or less.

<Polarizing Film>

The polarizing film of the invention includes a polarizer and an adhesive layer formed on at least one surface of the polarizer by curing the curable resin composition. In particular, the polarizing film preferably has a transparent protective film provided on at least one surface of the polarizer with the adhesive layer interposed therebetween. Hereinafter, a polarizing film including a polarizer and a transparent protective film provided on at least one surface of the polarizer with the adhesive layer interposed therebetween will be described by way of example.

<Adhesive Layer>

The adhesive layer is made from the curable resin composition. In particular, the adhesive layer preferably has a thickness of 0.01 to 3.0 μm. If the adhesive layer is too thin, it may have insufficient cohesive strength and reduced peel strength, which are not preferred. If the adhesive layer is too thick, it may easily peel off when stress is applied to the cross-section of the polarizing film, so that impact-induced peeling defect may occur, which is not preferred. The thickness of the adhesive layer is more preferably from 0.1 to 2.5 μm, most preferably from 0.5 to 1.5 μm.

The curable resin composition is preferably so selected that it can form an adhesive layer with a glass transition temperature (Tg) of 60° C. or more, more preferably 70° C. or more, even more preferably 75° C. or more, further more preferably 100° C. or more, still more preferably 120° C. or more. On the other hand, if the adhesive layer has too high a Tg, it can reduce the flexibility of the polarizing film.

Therefore, the adhesive layer preferably has a Tg of 300° C. or less, more preferably 240° C. or less, even more preferably 180° C. or less. The glass transition temperature (Tg) can be measured with a dynamic viscoelastometer RSA-III manufactured by TA Instruments under the following conditions: sample size, 10 mm wide, 30 mm long; clamp distance, 20 mm; measurement mode, tensile mode; frequency, 1 Hz; rate of temperature rise, 5° C./minute. The dynamic viscoelasticity is measured, and the tan δ peak temperature is used as the Tg.

The curable resin composition is also preferably such that it can form an adhesive layer with a storage modulus of $1.0 \times 10^7$ Pa or more, more preferably $1.0 \times 10^8$ Pa or more, at 25° C. Pressure-sensitive adhesive layers have a storage modulus of $1.0 \times 10^3$ Pa to $1.0 \times 10^6$ Pa, which differs from that of the adhesive layer. The storage modulus of the adhesive layer has an influence on the cracking of the polarizer under heat cycles (e.g., from −40° C. to 80° C.) applied to the polarizing film. If the storage modulus is low, cracking defect may easily occur in the polarizer. The temperature range where the adhesive layer can have high storage modulus is more preferably 80° C. or less, most preferably 90° C. or less. The storage modulus can be measured together with the glass transition temperature (Tg) using a dynamic viscoelastometer RSA-III manufactured by TA Instruments under the same conditions. The dynamic viscoelasticity is measured, and the resulting storage modulus (E') is used.

The laminate according to the invention may be manufactured by a method of manufacturing a laminate including the substrate (C) and the adhesive layer formed on at least one surface of the substrate (C) by curing the curable resin composition, the method including the steps of: coating at least one surface of the substrate (C) with the curable resin composition; and curing the curable resin composition by applying active energy rays to the curable resin composition from the substrate (C) surface side or the curable resin composition-coated surface side. The substrate (C) will be described later. Particularly when the substrate (C) is a polyvinyl alcohol-based polarizer for a polarizing film, the laminate according to the invention may be manufactured by a method of manufacturing a polarizing film including a polyvinyl alcohol-based polarizer as the substrate (C), an adhesive layer formed by curing the curable resin composition, and a transparent protective film provided on at least one surface of the polyvinyl alcohol-based polarizer with the adhesive layer interposed therebetween, the method including the steps of: coating the surface of at least one of the polarizer and the transparent protective film with the curable resin composition; laminating the polarizer and the transparent protective film together; and bonding the polarizer and the transparent protective film together with the adhesive layer formed therebetween by curing the curable resin composition by application of active energy rays to the curable resin composition from the polarizer surface side or the transparent protective film surface side.

The polarizer as the substrate (C) may be subjected to a surface modification treatment before it is coated with the curable resin composition. In particular, the surface of the polarizer is preferably subjected to a surface modification treatment before it is coated with the curable resin composition or subjected to lamination. The surface modification treatment may be, for example, a corona treatment, a plasma treatment, or an ITRO treatment, and in particular, preferably a corona treatment. The corona treatment can produce polar functional groups such as carbonyl and amino groups on the surface of the polarizer, which can improve the adhesion to the adhesive layer. In addition, an ashing effect can be produced to remove foreign particles from the surface and to reduce irregularities on the surface, which makes it possible to produce a polarizing film with good appearance properties.

The method of applying the curable resin composition may be appropriately selected, depending on the viscosity of the curable resin composition and the desired thickness, from, for example, methods using a reverse coater, a gravure coater (direct, reverse, or offset), a bar reverse coater, a roll coater, a die coater, a bar coater, or a rod coater. The curable resin composition used in the invention preferably has a viscosity of 3 to 100 mPa·s, more preferably 5 to 50 mPa·s, most preferably 10 to 30 mPa·s. Too high a viscosity of the curable resin composition may cause low surface smoothness or poor appearance after the application, and thus is not preferred. When applied, the curable resin composition used in the invention may be heated or cooled to have an adjusted viscosity in a desired range.

The polarizer and the transparent protective film are laminated with the curable resin composition applied as described above and interposed therebetween. The polarizer and the transparent protective film may be laminated using a roll laminator or other means.

<Curing of Curable Resin Composition>

The curable resin composition according to the invention is preferably used in the form of an active energy ray-curable resin composition. The active energy ray-curable resin composition may be used in the form of an electron beam-curable, ultraviolet ray-curable, or visible ray-curable composition. In view of productivity, the curable resin composition is preferably in the form of a visible ray-curable resin composition.

<<Active Energy Ray-Curable Composition>>

After the lamination of the polarizer and the transparent protective film, the active energy ray-curable resin composition is cured by applying active energy rays (such as electron beams, ultraviolet rays, or visible rays) to the composition, so that an adhesive layer is formed. The active energy rays (such as electron beams, ultraviolet rays, or visible rays) may be applied from any appropriate direction. Preferably, the active energy rays are applied from the transparent protective film side. If applied from the polarizer side, the active energy rays (such as electron beams, ultraviolet rays, or visible rays) may degrade the polarizer.

<<Electron Beam-Curable Composition>>

Electron beams may be applied under any appropriate conditions where the active energy ray-curable resin composition as an electron beam-curable composition can be cured. For example, electron beams are preferably applied at an acceleration voltage of 5 kV to 300 kV, more preferably 10 kV to 250 kV. If the acceleration voltage is lower than 5 kV, electron beams may fail to reach the adhesive, so that insufficient curing may occur. If the acceleration voltage is higher than 300 kV, electron beams can have too high intensity penetrating through the material and thus may damage the transparent protective film or the polarizer. The exposure dose is preferably from 5 to 100 kGy, more preferably from 10 to 75 kGy. At an exposure dose of less than 5 kGy, the adhesive may be insufficiently cured. An exposure dose of more than 100 kGy may damage the transparent protective film or the polarizer and cause yellow discoloration or a reduction in mechanical strength, which may make it impossible to obtain the desired optical properties.

Electron beam irradiation is generally performed in an inert gas. If necessary, however, electron beam irradiation may be performed in the air or under conditions where a small amount of oxygen is introduced. When oxygen is appropriately introduced, oxygen-induced inhibition can be intentionally produced on the surface of the transparent protective film, to which electron beams are first applied, so that the transparent protective film can be prevented from being damaged and electron beams can be efficiently applied only to the adhesive, although it depends on the material of the transparent protective film.

<<Ultraviolet-Curable Composition and Visible Ray-Curable Composition>>

The method according to the invention of manufacturing a polarizing film preferably uses active energy rays including visible rays with a wavelength in the range of 380 nm to 450 nm, specifically, visible rays whose dose is the highest at a wavelength in the range of 380 nm to 450 nm. When the transparent protective film used with respect to the ultraviolet ray- or visible ray-curable composition has the ability to absorb ultraviolet rays (the ultraviolet non-transmitting transparent protective film), it can absorb light with wavelengths shorter than about 380 nm. This means that light with wavelengths shorter than 380 nm cannot reach the active energy ray-curable resin composition and thus cannot contribute to the polymerization reaction of the composition. When absorbed by the transparent protective film, the light with wavelengths shorter than 380 nm is also converted into heat, so that the transparent protective film itself can generate heat, which can cause a defect such as curling or wrinkling of the polarizing film. In the invention, therefore, when the ultraviolet ray- or visible ray-curable composition is used, the active energy ray generator used preferably does not emit light with wavelengths shorter than 380 nm. More specifically, the ratio of the total illuminance in the wavelength range of 380 to 440 nm to the total illuminance in the wavelength range of 250 to 370 nm is preferably from 100:0 to 100:50, more preferably from 100:0 to 100:40. In the invention, the source of active energy rays is preferably a gallium-containing metal halide lamp or an LED light source emitting light with a wavelength in the range of 380 to 440 nm. Alternatively, a source of light containing ultraviolet and visible wavelengths, such as a low-pressure mercury lamp, a middle-pressure mercury lamp, a high-pressure mercury lamp, an ultrahigh-pressure mercury lamp, an incandescent lamp, a xenon lamp, a halogen lamp, a carbon arc lamp, a metal halide lamp, a fluorescent lamp, a tungsten lamp, a gallium lamp, an excimer laser, or sunlight may be used in combination with a band pass filter for blocking ultraviolet light with wavelengths shorter than 380 nm. For the purpose of preventing the polarizing film from curling while increasing the adhesion performance of the adhesive layer between the polarizer and the transparent protective film, it is preferable to use active energy rays obtained from a gallium-containing metal halide lamp through a band pass filter capable of blocking light with wavelengths shorter than 380 nm or to use active energy rays with a wavelength of 405 nm obtained with an LED light source.

When the active energy ray-curable resin composition is ultraviolet ray- or visible ray-curable, the active energy ray-curable resin composition is preferably heated before irradiated with ultraviolet or visible rays (heating before irradiation). In this case, the composition is preferably heated to 40° C. or higher, more preferably 50° C. or higher. The active energy ray-curable resin composition is also preferably heated after irradiated with ultraviolet or visible rays (heating after irradiation). In this case, the composition is preferably heated to 40° C. or higher, more preferably 50° C. or higher.

The active energy ray-curable resin composition according to the invention is particularly suitable for use in forming an adhesive layer to bond a polarizer and a transparent protective film with a 365 nm wavelength light transmittance of less than 5%. When containing the photopolymerization initiator of formula (3) shown above, the active energy ray-curable resin composition according to the invention can form a cured adhesive layer by being irradiated with ultraviolet rays through a transparent protective film having the ability to absorb UV. In this case, the adhesive layer can be cured even in a polarizing film including a polarizer and transparent protective films placed on both sides of the polarizer and each having the ability to absorb UV. It will be understood, however, that the adhesive layer can be cured also in a polarizing film where the transparent protective films placed on the polarizer have no ability to absorb UV. As used herein, the term "transparent protective films having the ability to absorb UV" means transparent protective films with a 380 nm light transmittance of less than 10%.

Methods for imparting the ability to absorb UV to the transparent protective film include a method of adding an ultraviolet absorber into the transparent protective film and a method of placing, on the surface of the transparent protective film, a surface treatment layer containing an ultraviolet absorber.

Examples of the ultraviolet absorber include conventionally known oxybenzophenone compounds, benzotriazole compounds, salicylate ester compounds, benzophenone compounds, cyanoacrylate compounds, nickel complex salt compounds, and triazine compounds.

After the polarizer and the transparent protective film are laminated together, the active energy ray-curable resin composition is cured by the application of active energy rays (such as electron beams, ultraviolet rays, or visible rays) to form an adhesive layer. Active energy rays (such as electron beams, ultraviolet rays, or visible rays) may be applied from any suitable direction. Preferably, active energy rays are applied to the composition from the transparent protective film side. If applied from the polarizer side, active energy rays (such as electron beams, ultraviolet rays, or visible rays) may degrade the polarizer.

When the polarizing film according to the invention is manufactured using a continuous line, the line speed is preferably from 1 to 500 m/minute, more preferably from 5 to 300 m/minute, even more preferably from 10 to 100 m/minute, depending on the time required to cure the curable resin composition. If the line speed is too low, the productivity may be low, or damage to the transparent protective film may be too much, which may make it impossible to produce a polarizing film capable of withstanding durability tests or other tests. If the line speed is too high, the curable composition may be insufficiently cured, so that the desired adhesion may fail to be obtained.

The polarizing film of the invention preferably includes a polarizer and a transparent protective film bonded together with an adhesive layer that is interposed therebetween and made of a layer of a curing product of the active energy ray-curable resin composition. Such a polarizing film may further include an adhesion-facilitating layer between the transparent protective film and the adhesive layer. For example, the adhesion-facilitating layer may be made of any of various resins having a polyester skeleton, a polyether skeleton, a polycarbonate skeleton, a polyurethane skeleton, a silicone skeleton, a polyamide skeleton, a polyimide skeleton, a polyvinyl alcohol skeleton, or other polymer skeletons. These polymer resins may be used singly or in combination of two or more. Other additives may also be added to form the adhesion-facilitating layer. More specifically, a tackifier, an ultraviolet absorber, an antioxidant, or a stabilizer such as a heat-resistant stabilizer may also be used to form the adhesion-facilitating layer.

Generally, the adhesion-facilitating layer is provided in advance on the transparent protective film, and then the adhesion-facilitating layer side of the transparent protective film is bonded to the polarizer with the adhesive layer. The adhesion-facilitating layer can be formed using a known technique that includes applying an adhesion-facilitating-layer-forming material onto the transparent protective film and drying the material. The adhesion-facilitating-layer-forming material is generally prepared in the form of a solution which is diluted to a suitable concentration taking into account the coating thickness after drying, the smoothness of the application, and other factors. After dried, the adhesion-facilitating layer preferably has a thickness of 0.01 to 5 μm, more preferably 0.02 to 2 μm, even more preferably 0.05 to 1 μm. Two or more adhesion-facilitating layers may be provided. Also in this case, the total thickness of the adhesion-facilitating layers preferably falls within such ranges.

<Substrate (C)>

The substrate (C) may be, for example, a polarizer, a transparent protective film, a retardation plate, or a glass sheet. The substrate (C) is preferably a polyvinyl alcohol-based polarizer (HSP value 36.0), a transparent protective film including triacetyl cellulose (TAC) (HSP value 19.1) or polymethyl methacrylate (PMMA) (HSP value 22.3), or a glass sheet including non-alkali glass (HSP value 28.4).

<Polarizer>

Any of various polarizers may be used without limitation. The polarizer may be, for example, a product produced by a process including adsorbing a dichroic material such as iodine or a dichroic dye to a hydrophilic polymer film such as a polyvinyl alcohol-based film, a partially-formalized polyvinyl alcohol-based film, or a partially-saponified, ethylene-vinyl acetate copolymer-based film and uniaxially stretching the film or may be a polyene-based oriented film such as a film of a dehydration product of polyvinyl alcohol or a dehydrochlorination product of polyvinyl chloride. In particular, a polarizer including a polyvinyl alcohol-based film and a dichroic material such as iodine is advantageous. The thickness of the polarizer is generally from 2 to 30 μm, more preferably from 4 to 20 μm, most preferably from 5 to 15 μm. An excessively thin polarizer can have reduced optical durability and thus is not preferred. An excessively thick film can undergo significant dimensional changes and cause the problem of display unevenness and thus is not preferred.

A polarizer including a uniaxially-stretched polyvinyl alcohol-based film dyed with iodine can be produced, for example, by a process including immersing a polyvinyl alcohol film in an aqueous iodine solution to dye the film and stretching the film to 3 to 7 times the original length. If necessary, the film may also be immersed in an aqueous solution of boric acid or potassium iodide. If necessary, the polyvinyl alcohol-based film may be further immersed in water for washing before it is dyed. When the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid or potassium iodide or in a water bath.

In the invention, the advantageous effects of the use of the active energy ray-curable resin composition (a satisfactory level of optical durability in a harsh environment at high temperature and high humidity) will be significantly produced when a thin polarizer with a thickness of 10 μm or less is used. Such a polarizer with a thickness of 10 μm or less is relatively more affected by water, have less sufficient optical durability in an environment at high temperature and high humidity, and are more likely to increase in transmittance or decrease in degree of polarization than polarizers with a thickness of more than 10 μm. In other words, when the adhesive layer according to the invention with a bulk water absorption rate of 10% by weight or less is formed on the polarizer with a thickness of 10 μm or less, the movement of water into the polarizer is suppressed in a harsh environment at high temperature and high humidity, which makes it possible to significantly suppress degradation in the optical durability of the polarizing film, such as an increase in the transmittance of the polarizing film or a decrease in the degree of polarization of the polarizing film. For thickness reduction, the thickness of the polarizer is preferably from 1 to 7 μm. Such a thin polarizer is preferred because it is less uneven in thickness, provides good visibility, is less dimensionally-variable, and can form a thin polarizing film.

Typical examples of such a thin polarizer include the thin polarizing films described in JP-A-51-069644, JP-A-2000-338329, WO2010/100917, PCT/JP2010/001460, Japanese Patent Application No. 2010-269002, and Japanese Patent Application No. 2010-263692. These thin polarizing films can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage by stretching, because the layer is supported on the stretchable resin substrate.

Among processes including the steps of stretching and dyeing a laminate, a process capable of achieving high-ratio stretching to improve polarizing performance is preferably used when the thin polarizing film is formed. Thus, the thin polarizing film is preferably obtained by a process including the step of stretching in an aqueous boric acid solution as described in WO2010/100917, PCT/JP2010/001460, Japanese Patent Application No. 2010-269002, or Japanese Patent Application No. 2010-263692, and more preferably obtained by a process including the step of performing auxiliary in-air stretching before stretching in an aqueous boric acid solution, as described in Japanese Patent Application No. 2010-269002 or 2010-263692.

<Transparent Protective Film>

The transparent protective film is preferably made of a material having a high level of transparency, mechanical strength, thermal stability, water barrier properties, isotropy, and other properties. Examples of such a material include polyester polymers such as polyethylene terephthalate and polyethylene naphthalate, cellulose polymers such as diacetyl cellulose and triacetyl cellulose, acryl-based polymers such as polymethyl methacrylate, styrene polymers such as polystyrene and acrylonitrile-styrene copolymers (AS resins), and polycarbonate polymers. Examples of polymers that may be used to form the transparent protective film also include polyolefin polymers such as polyethylene, polypropylene, cyclo- or norbornene-structure-containing polyolefin, and ethylene-propylene copolymers, vinyl chloride polymers, amide polymers such as nylon and aromatic polyamide, imide polymers, sulfone polymers, polyether sulfone polymers, polyether ether ketone polymers, polyphenylene sulfide polymers, vinyl alcohol polymers, vinylidene chloride polymers, vinyl butyral polymers, arylate polymers, polyoxymethylene polymers, epoxy polymers, or any blends of the above polymers. The transparent protective film may also contain any type of one or more appropriate additives. Examples of such additives include ultraviolet absorbers, antioxidants, lubricants, plasticizers, release agents, discoloration preventing agents, flame retardants, nucleating agents, antistatic agents, pigments, and colorants. The content of the thermoplastic resin in the transparent protective film is preferably from 50 to 100% by weight, more preferably from 50 to 99% by weight, even more preferably from 60 to 98% by weight, further more preferably from 70 to 97% by weight. If the content of the thermoplastic resin in the transparent protective film is 50% by weight or less, high transparency and other properties inherent in the thermoplastic resin may fail to be sufficiently exhibited.

The transparent protective film may also be the polymer film disclosed in JP-A-2001-343529 (WO01/37007), such as a film of a resin composition containing (A) a thermoplastic resin having a substituted and/or unsubstituted imide group in the side chain and (B) a thermoplastic resin having a substituted and/or unsubstituted phenyl and nitrile groups in the side chain. A specific example includes a film of a resin composition containing an alternating copolymer of isobutylene and N-methylmaleimide and an acrylonitrile-styrene copolymer. Films such as those produced by mixing and extruding the resin composition may be used. These films have a small retardation and a small photoelastic coefficient and thus can prevent polarizing films from having defects such as strain-induced unevenness. They also have low water-vapor permeability and thus have high moisture resistance.

In the polarizing film, the transparent protective film preferably has a water-vapor permeability of 150 $g/m^2/24$ hours or less. This feature makes the polarizing film resistant to the entry of water from the air and also prevents the polarizing film from changing in water content. As a result, storage environment-induced curling or dimensional change of the polarizing film can be suppressed.

The transparent protective film or films provided on one or both sides of the polarizer should preferably have a high level of transparency, mechanical strength, thermal stability, water barrier properties, isotropy, and other properties. In particular, the transparent protective film or films preferably have a water-vapor permeability of 150 $g/m^2/24$ hours or less, more preferably 140 $g/m^2/24$ hours or less, even more preferably 120 $g/m^2/24$ hours or less. The water-vapor permeability can be determined by the method described in the Examples section.

Examples of materials that may be used to form the transparent protective film with a satisfactorily low level of water-vapor permeability as mentioned above include polyester resins such as polyethylene terephthalate and polyethylene naphthalate, polycarbonate resins, arylate resins, amide resins such as nylon and aromatic polyamide, polyolefin polymers such as polyethylene, polypropylene, and ethylene-propylene copolymers, cyclic olefin-based resins having a cyclo- or norbornene structure, (meth)acrylic resins, or any blends thereof. Among these resins, polycarbonate resins, cyclic polyolefin resins, and (meth)acrylic resins are preferred, and cyclic polyolefin resins and (meth)acrylic resins are particularly preferred.

The thickness of the transparent protective film may be selected as appropriate. In general, the transparent protective film preferably has a thickness of 5 to 100 μm in view of strength, workability such as handleability, thin layer formability, and other properties. In particular, the thickness of the transparent protective film is preferably from 10 to 60 μm, more preferably from 20 to 40 μm.

The polarizer and the protective film may be bonded by a method using a roll laminator. The method of placing protective films on both sides of the polarizer may be selected from a method of attaching one protective film to the polarizer and then attaching another protective film to the polarizer and a method of simultaneously attaching two protective films to the polarizer. The former method, namely, the method of attaching one protective film to the polarizer and then attaching another protective film is preferred because it can significantly reduce the occurrence of entrapped air bubbles during the attachment.

The method of curing the curable resin composition may be appropriately selected in a manner depending on the curing mode of the curable resin composition. When the curable resin composition is thermosetting, it can be cured by a heat treatment. The heat treatment method may be any conventionally known method such as a hot air oven method or an IR oven method. When the curable resin composition is active energy ray-curable, it can be cured by application of active energy rays such as electron beams, ultraviolet rays, or visible rays. When the curable resin composition is both thermosetting and active energy ray-curable, any appropriate combination of the above methods may be used. The curable resin composition according to the invention is preferably active energy ray-curable. Advantageously, the use of the active energy ray-curable resin composition makes it possible not only to provide high productivity but also to suppress the thermal degradation of the optical properties of the polarizer. In addition, the curable resin composition of the invention is preferably substantially free of any volatile solvent. Advantageously, the composition substantially free of any volatile solvent does not need a heat treatment, which makes it possible not only to provide high productivity but also to suppress the thermal degradation of the optical properties of the polarizer.

<Optical Film>

For practical use, the polarizing film of the invention may be laminated with any other optical layer or layers to form an optical film. As a non-limiting example, such an optical layer or layers may be one or more reflectors, transflectors, retardation plates (including wavelength plates such as half or quarter wavelength plates), viewing angle compensation films, or other optical layers, which have ever been used in liquid crystal display devices or other devices. Particularly preferred is a reflective or transflective polarizing film including the polarizing film of the invention and a reflector or a transflector disposed thereon, an elliptically or circularly polarizing film including the polarizing film and a retardation plate disposed thereon, a wide viewing angle polarizing film including the polarizing film and a viewing angle compensation film disposed thereon, or a polarizing film including the polarizing film and a brightness enhancement film disposed thereon.

The optical film including the polarizing film and the optical layer disposed thereon may be formed by a method of stacking them one by one in the process of manufacturing a liquid crystal display device or the like. However, an optical film formed in advance by lamination is advantageous in that it can facilitate the process of manufacturing a liquid crystal display device or the like, because it has stable quality and good assembling workability. In the lamination, any appropriate bonding means such as a pressure-sensitive adhesive layer may be used. When the polarizing film and any other optical film are bonded together, their optical axes may be each aligned at an appropriate angle, depending on the desired retardation properties or other desired properties.

A pressure-sensitive adhesive layer for bonding to any other member such as a liquid crystal cell may also be provided on the polarizing film or the optical film including a laminate having at least one layer of the polarizing film. As a non-limiting example, the pressure-sensitive adhesive for use in forming the pressure-sensitive adhesive layer may be appropriately selected from pressure-sensitive adhesives containing, as a base polymer, an acryl-based polymer, a silicone-based polymer, polyester, polyurethane, polyamide, polyether, a fluoropolymer, or a rubber polymer. In particular, a pressure-sensitive adhesive having a high level of optical transparency, weather resistance, and heat resistance and exhibiting an appropriate degree of wettability, cohesiveness, and adhesion is preferably used, such as an acrylic pressure-sensitive adhesive.

The pressure-sensitive adhesive layer may also be formed as a laminate of layers different in composition, type, or other features on one or both sides of the polarizing film or the optical film. When pressure-sensitive adhesive layers are provided on both front and back sides of the polarizing film or the optical film, they may be different in composition, type, thickness, or other features. The thickness of the pressure-sensitive adhesive layer may be determined depending on the intended use, adhering strength, or other factors, and is generally from 1 to 500 µm, preferably from 1 to 200 µm, more preferably from 1 to 100 µm.

The exposed surface of the pressure-sensitive adhesive layer may be temporarily covered with a separator for anti-pollution or other purposes until it is actually used. This can prevent contact with the pressure-sensitive adhesive layer during usual handling. According to conventional techniques, except for the above thickness conditions, a suitable separator may be used, such as a plastic film, a rubber sheet, a paper sheet, a cloth, a nonwoven fabric, a net, a foam sheet, a metal foil, any laminate thereof, or any other suitable thin material, which is optionally coated with any suitable release agent such as a silicone, long-chain alkyl, or fluoride release agent, or molybdenum sulfide.

<Image Display Device>

The polarizing film or optical film of the invention is preferably used to form liquid crystal display devices or other various devices. Liquid crystal display devices may be formed according to conventional techniques. Specifically, a liquid crystal display device may be typically formed by appropriately assembling a liquid crystal cell, polarizing films or optical films, and an optional component such as a lighting system, and incorporating a driving circuit according to any conventional techniques, except that the polarizing films or optical films used are according to the invention. The liquid crystal cell to be used may also be of any type such as TN type, STN type, or n type.

Any desired liquid crystal display device may be formed, such as a liquid crystal display device including a liquid crystal cell and the polarizing or optical film or films placed on one or both sides of the liquid crystal cell or a liquid crystal display device further including a backlight or a reflector in a lighting system. In such a case, the polarizing or optical film or films according to the invention may be placed on one or both sides of the liquid crystal cell. When the polarizing or optical films are provided on both sides, they may be the same or different. The process of forming a liquid crystal display device may also include placing a suitable component such as a diffusion plate, an antiglare layer, an anti-reflection film, a protective plate, a prism array, a lens array sheet, a light diffusion plate, or a backlight in one or more layers at a suitable position or positions.

EXAMPLES

Hereinafter, examples of the invention will be described. It will be understood that the examples are not intended to limit the embodiments of the invention.

<Preparation of Polarizer>

A 45-µm-thick polyvinyl alcohol film with an average degree of polymerization of 2,400 and a degree of saponification of 99.9% by mole was immersed in warm water at 30° C. for 60 seconds so that the film was allowed to swell. The film was then immersed in an aqueous solution of 0.3% iodine/potassium iodide (0.5/8 in weight ratio) and dyed while stretched to 3.5 times. The film was then stretched to a total stretch ratio of 6 times in a boric acid aqueous solution at 65° C. After the stretching, the film was dried in an oven at 40° C. for 3 minutes to give a polyvinyl alcohol-based polarizer (18 µm in thickness) as the substrate (C). The polyvinyl alcohol-based polarizer had an HSP value (HSP (C)) of 36.0 $(MJ/m^3)^{1/2}$.

<Active Energy Rays>

The source of active energy rays used was a visible light irradiator (gallium-containing metal halide lamp) Light Hammer 10 manufactured by Fusion UV Systems Inc. (valve, V valve; peak illuminance, 1,000 $mW/cm^2$; total dose, 1,000/$mJ/cm^2$; wavelength, 380-440 nm). The illuminance of the visible light was measured with Sola-Check System manufactured by Solatell Ltd.

Examples 1 to 5 and Comparative Examples 1 to 3

(Preparation of Curable Resin Compositions)

According to the formulation shown in Table 1, the respective components were mixed and stirred for 1 hour to form an active energy ray-curable resin composition for each of Examples 1 to 5 and Comparative Examples 1 to 3.

(Preparation of Evaluation Samples)

Each active energy ray-curable resin composition obtained as described above was diluted with tetrahydrofuran (THF) to 10 wt %, and 0.5 ml of the dilution was dropped on the substrate (C) as an adherend and then applied in the form of a thin film using a spin coater. The thin film was then dried at 40° C. for 2 minutes to give an about 1-µm-thick thin film (adhesive layer). The spin coating conditions were as follows: 1st stage at 250 rpm for 5 seconds and 2nd stage at 1,000 rpm for 10 seconds. Each resulting evaluation sample was evaluated as described below. Table 1 shows the evaluation results.

<Adhesion>

The adhesion of the adhesive layer to the adherend was measured by the cross-cut method according to JIS K 5600 (the number of cross-cuts: 25), in which the number of broken areas and the broken interface were evaluated based on the criteria below.

A: Test tape/cured resin interface separation
B: Cohesive fracture of cured resin
C: Polarizer/cured resin interface fracture The criteria A and B indicate that the adhering strength to the polarizer is very good. On the other hand, the criterion C indicates that the adhering strength at the polarizer/ adhesive layer interface is poor. Taking them into account, the adhering strength rated A or B is represented by the symbol ○, while the adhering strength rated C is represented by the symbol x.

<Test for Water-Resistant Adhesion>

Using the polarizing film obtained in each example, a sample was prepared in the same manner as for the adhering strength measurement. Each sample was stored for 3 days at 25° C. and 98% RH and then evaluated for adhesion in the same manner as described above. The adhesion (water-resistant adhesion) was evaluated immediately after the warming at 25° C. and 98% RH.

The materials shown in Table 1 are as follows:

Compound (A):
  3-Acrylamidophenylboronic acid (manufactured by JUNSEI CHEMICAL CO., LTD.) with an HSP value of 33.3 $(MJ/m^3)^{1/2}$ Compound B:
  HEAA (hydroxyethylacrylamide manufactured by Kohjin Co., Ltd.) with an HSP value of 33.5 $(MJ/m^3)^{1/2}$
  Methylolmelamine (WATERSOL S-695 manufactured by DIC Corporation) with an HSP value of 37.0 $(MJ/m^3)^{1/2}$
  N-methylolacrylamide (manufactured by Tokyo Chemical Industry Co., Ltd.) with an HSP value of 39.2 $(MJ/m^3)^{1/2}$

TABLE 1

| | | | Example 1 | Example 2 | Example 3 | Example 4 | Example 5 |
|---|---|---|---|---|---|---|---|
| Curable resin composition | Compound (A) | 3-acrylamidophenylboronic acid | 1 | 1 | 1 | 1 | 1 |
| | Compound (B) | HEAA | 10 | — | — | — | — |
| | | Methylolmelamine | — | 10 | — | — | — |
| | | N-methylolacrylamide | — | — | 10 | — | — |
| | | Water | — | — | — | 10 | — |
| | | Glycerin | — | — | — | — | 10 |
| | | Urea | — | — | — | — | — |
| | Additional curable components | ACMO | — | — | — | — | — |
| | | HEMA | — | — | — | — | — |
| | | 1,9-Nonanediol diacrylate | 53 | 53 | 53 | 53 | 53 |
| | | Tricyclodecanedimethanol diacrylate | 30 | 30 | 30 | 30 | 30 |
| | Polymerization initiator | IRGACURE 907 | 3 | 3 | 3 | 3 | 3 |
| | | KAYACURE DETX-S | 3 | 3 | 3 | 3 | 3 |
| | | Substrate (C) | PVA-based polarizer | PVA-based polarizer | PVA-based polarizer | PVA-based polarizer | PVA-based polarizer |
| | | | Initial adhering strength | | | | |
| Evaluations | Cross-cut method (of the 25 cross-cuts) | Number of peeled cuts | 0 | 0 | 0 | 0 | 0 |
| | | Delamination interface | ○ (A) | ○ (A) | ○ (A) | ○ (A) | ○ (A) |
| | | | Evaluation of water-resistant adhesion | | | | |
| | Cross-cut method (of the 25 cross-cuts) | Number of peeled cuts | 0 | 0 | 0 | 10 | 8 |
| | | Delamination interface | ○ (A) | ○ (A) | ○ (A) | ○ (B) | ○ (B) |

| | | | Example 6 | Comparative Example 1 | Comparative Example 2 | Comparative Example 3 |
|---|---|---|---|---|---|---|
| Curable resin composition | Compound (A) | 3-acrylamidophenylboronic acid | 1 | — | 1 | 1 |
| | Compound (B) | HEAA | — | 10 | — | — |
| | | Methylolmelamine | — | — | — | — |
| | | N-methylolacrylamide | — | — | — | — |
| | | Water | — | — | — | — |
| | | Glycerin | — | — | — | — |
| | | Urea | 10 | — | — | — |
| | Additional curable components | ACMO | — | — | 10 | — |
| | | HEMA | — | — | — | 10 |
| | | 1,9-Nonanediol diacrylate | 53 | 53 | 53 | 53 |
| | | Tricyclodecanedimethanol diacrylate | 30 | 30 | 30 | 30 |
| | Polymerization initiator | IRGACURE 907 | 3 | 3 | 3 | 3 |
| | | KAYACURE DETX-S | 3 | 3 | 3 | 3 |
| | | Substrate (C) | PVA-based polarizer | PVA-based polarizer | PVA-based polarizer | PVA-based polarizer |
| | | | Initial adhering strength | | | |
| Evaluations | Cross-cut method (of the 25 cross-cuts) | Number of peeled cuts | 0 | 0 | 25 | 25 |
| | | Delamination interface | ○ (A) | ○ (A) | X (C) | X (C) |
| | | | Evaluation of water-resistant adhesion | | | |
| | Cross-cut method (of the 25 cross-cuts) | Number of peeled cuts | 12 | 25 | 25 | 25 |
| | | Delamination interface | ○ (B) | X (C) | X (C) | X (C) |

Water (ion-exchanged water) with an HSP value of 30.1 $(MJ/m^3)^{1/2}$

Glycerin (manufactured by Tokyo Chemical Industry Co., Ltd.) with an HSP value of 35.7 $(MJ/m^3)^{1/2}$ Additional curable components:

ACMO (acryloylmorpholine manufactured by Kohjin Co., Ltd.) with an HSP value of 24.5 $(MJ/m^3)^{1/2}$ HEMA (hydroxyethyl methacrylate manufactured by Tokyo Chemical Industry Co., Ltd.) with an HSP value of 21.9 $(MJ/m^3)^{1/2}$ 1,9-Nonanediol diacrylate (LIGHT ACRYLATE 1,9ND-A manufactured by Kyoeisha Chemical Co., Ltd.)

Tricyclodecanedimethanol diacrylate (LIGHT ACRYLATE DCP-A manufactured by Kyoeisha Chemical Co., Ltd.)

Polymerization Initiator:

IRGACURE 907 (manufactured by BASF)

KAYACURE DETX-S (manufactured by Nippon Kayaku Co., Ltd.)

What is claimed is:

1. A polarizing film comprising:
a polyvinyl alcohol-based polarizer as a substrate (C);
an adhesive layer formed by curing a curable resin composition, the curable resin composition comprising:
a compound (A) represented by formula (1):

[Formula 1]

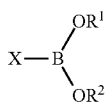

(1)

wherein X represents a functional group containing a reactive group, and $R^1$ and $R^2$ each independently represent a hydrogen atom or a substituted, aliphatic hydrocarbon, aryl, or heterocyclic group; and
an adhesion aid compound (B),
the curable resin composition satisfying formula (X): −10≤HSP (A)−HSP (B)≤10 and formula (Y): −10≤HSP (C)−HSP (B)≤10, wherein HSP (A) is an HSP value of the compound (A), HSP (B) is an HSP value of the adhesion aid compound (B), and HSP (C) is an HSP value of the substrate (C); and
a transparent protective film provided on at least one surface of the polyvinyl alcohol-based polarizer with the adhesive layer interposed between the polarizer and the transparent protective film.

2. The polarizing film according to claim 1, wherein the adhesion aid compound (B) is at least one compound selected from the group consisting of: a compound (B)-1 represented by formula (2):

[Formula 2]

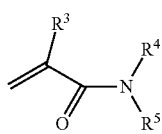

(2)

wherein $R^3$ is a hydrogen atom or a methyl group, $R^4$ and $R^5$ are each independently a hydrogen atom, an alkyl group, a hydroxyalkyl group, an alkoxyalkyl group, or a cyclic ether group; a compound (B)-2 represented by formula (3):

[Formula 3]

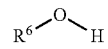

(3)

wherein $R^6$ is a hydrogen atom, an alkyl group, a hydroxyalkyl group, an alkoxyalkyl group, or a cyclic ether group; a compound (B)-3 represented by formula (4):

[Formula 4]

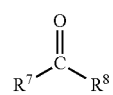

(4)

wherein $R^7$ and $R^8$ are each independently an amide group, an alkyl group, a hydroxyalkyl group, an alkoxyalkyl group, or a cyclic ether group; and a compound (B)-4 represented by formula (5):

[Formula 5]

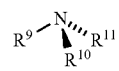

(5)

wherein $R^9$, $R^{10}$, and $R^{11}$ are each independently a hydrogen atom, a hydroxyl group, an alkyl group, a hydroxyalkyl group, an alkoxyalkyl group, or a cyclic ether group.

3. The polarizing film according to claim 1, wherein the compound represented by formula (1) is a compound represented by formula (1'):

[Formula 6]

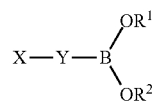

(1')

wherein Y is a phenylene group or an alkylene group.

4. The polarizing film according to claim 1, wherein the reactive group of the compound (A) is at least one reactive group selected from the group consisting of a vinyl group, a (meth)acrylic group, a styryl group, a (meth)acrylamide group, a vinyl ether group, an epoxy group, an oxetane group, and a mercapto group.

5. An optical film comprising a laminate comprising at least one piece of the polarizing film according to claim 1.

6. An image display device comprising the polarizing film according to claim 1.

7. A method of manufacturing a polarizing film comprising a polyvinyl alcohol-based polarizer as a substrate (C), an adhesive layer formed by curing a curable resin composition, and a transparent protective film provided on at least one surface of the polyvinyl alcohol-based polarizer with the adhesive layer interposed between the polarizer and the transparent protective film, the method comprising the steps of:

coating a surface of at least one of the polarizer and the transparent protective film with a curable resin composition, the curable resin composition comprising:

a compound (A) represented by formula (1):

[Formula 1]

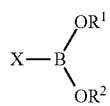
(1)

wherein X represents a functional group containing a reactive group, and $R^1$ and $R^2$ each independently represent a hydrogen atom or a substituted, aliphatic hydrocarbon, aryl, or heterocyclic group; and an adhesion aid compound (B), the curable resin composition satisfying formula (X): −10≤HSP (A)−HSP (B)≤10 and formula (Y): −10≤HSP (C)−HSP (B)≤10, wherein HSP (A) is an HSP value of the compound (A), HSP (B) is an HSP value of the adhesion aid compound (B), and HSP (C) is an HSP value of the substrate (C);

laminating the polarizer and the transparent protective film together; and bonding the polarizer and the transparent protective film together with the adhesive layer formed therebetween by curing the curable resin composition by application of an active energy ray to the curable resin composition from the polarizer surface side or the transparent protective film surface side.

8. An image display device comprising the polarizing film according to claim 5.

9. The polarizing film according to claim 1, wherein the adhesion aid compound (B) is at least one compound selected from the group consisting of: a compound (B)-1 represented by formula (2):

[Formula 2]

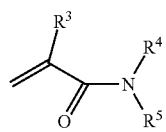
(2)

wherein $R^3$ is a hydrogen atom or a methyl group, $R^4$ and $R^5$ are each independently a hydrogen atom, an alkyl group, a hydroxyalkyl group, an alkoxyalkyl group, or a cyclic ether group, and $R^4$ and $R^5$ form a heterocyclic ring; a compound (B)-2 represented by formula (3):

[Formula 3]

(3)

wherein $R^6$ is a hydrogen atom, an alkyl group, a hydroxyalkyl group, an alkoxyalkyl group, or a cyclic ether group, and form a heterocyclic ring; a compound (B)-3 represented by formula (4):

[Formula 4]

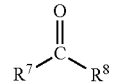
(4)

wherein $R^7$ and $R^8$ are each independently an amide group, an alkyl group, a hydroxyalkyl group, an alkoxyalkyl group, or a cyclic ether group, and form a heterocyclic ring; and a compound (B)-4 represented by formula (5):

[Formula 5]

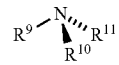
(5)

wherein $R^9$, $R^{10}$, and $R^{11}$ are each independently a hydrogen atom, a hydroxyl group, an alkyl group, a hydroxyalkyl group, an alkoxyalkyl group, or a cyclic ether group, and form a heterocyclic ring.

10. The method of manufacturing a polarizing film according to claim 7, wherein the compound represented by formula (1) is a compound represented by formula (1'):

[Formula 6]

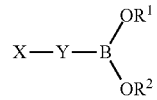
(1')

wherein Y is a phenylene group or an alkylene group.

11. The method of manufacturing a polarizing film according to claim 7, wherein the reactive group of the compound (A) is at least one reactive group selected from the group consisting of a vinyl group, a (meth)acrylic group, a styryl group, a (meth)acrylamide group, a vinyl ether group, an epoxy group, an oxetane group, and a mercapto group.

12. The method of manufacturing a polarizing film according to claim 7, wherein the adhesion aid compound (B) is at least one compound selected from the group consisting of: a compound (B)-1 represented by formula (2):

[Formula 2]

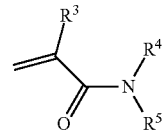
(2)

wherein $R^3$ is a hydrogen atom or a methyl group, $R^4$ and $R^5$ are each independently a hydrogen atom, an alkyl group, a hydroxyalkyl group, an alkoxyalkyl group, or a cyclic ether group; a compound (B)-2 represented by formula (3):

[Formula 3]

(3)

wherein $R^6$ is a hydrogen atom, an alkyl group, a hydroxyalkyl group, an alkoxyalkyl group, or a cyclic ether group; a compound (B)-3 represented by formula (4):

[Formula 4]

(4)

wherein $R^7$ and $R^8$ are each independently an amide group, an alkyl group, a hydroxyalkyl group, an alkoxyalkyl group, or a cyclic ether group; and a compound (B)-4 represented by formula (5):

[Formula 5]

(5)

wherein $R^9$, $R^{10}$, and $R^{11}$ are each independently a hydrogen atom, a hydroxyl group, an alkyl group, a hydroxyalkyl group, an alkoxyalkyl group, or a cyclic ether group.

13. The method of manufacturing a polarizing film according to claim 7, wherein the adhesion aid compound (B) is at least one compound selected from the group consisting of: a compound (B)-1 represented by formula (2):

[Formula 2]

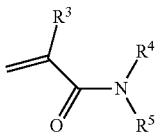
(2)

wherein $R^3$ is a hydrogen atom or a methyl group, $R^4$ and $R^5$ are each independently a hydrogen atom, an alkyl group, a hydroxyalkyl group, an alkoxyalkyl group, or a cyclic ether group, and $R^4$ and $R^5$ form a heterocyclic ring; a compound (B)-2 represented by formula (3):

[Formula 3]

(3)

wherein $R^6$ is a hydrogen atom, an alkyl group, a hydroxyalkyl group, an alkoxyalkyl group, or a cyclic ether group, and form a heterocyclic ring; a compound (B)-3 represented by formula (4):

[Formula 4]

(4)

wherein $R^7$ and $R^8$ are each independently an amide group, an alkyl group, a hydroxyalkyl group, an alkoxyalkyl group, or a cyclic ether group, and form a heterocyclic ring; and a compound (B)-4 represented by formula (5):

[Formula 5]

(5)

wherein $R^9$, $R^{10}$, and $R^{11}$ are each independently a hydrogen atom, a hydroxyl group, an alkyl group, a hydroxyalkyl group, an alkoxyalkyl group, or a cyclic ether group, and form a heterocyclic ring.

\* \* \* \* \*